(12) United States Patent
Arai et al.

(10) Patent No.: US 10,364,574 B2
(45) Date of Patent: Jul. 30, 2019

(54) CONTINUOUS SCREW TIGHTENING MACHINE WITH WASHER STACKING SUPPLY MECHANISM

(71) Applicant: MURO CORPORATION, Tokyo (JP)

(72) Inventors: Kunihiro Arai, Utsunomiya (JP); Yoichi Watanabe, Utsunomiya (JP)

(73) Assignee: MURO CORPORATION, Tokyo (JP)

( * ) Notice: Subject to any disclaimer, the term of this patent is extended or adjusted under 35 U.S.C. 154(b) by 792 days.

(21) Appl. No.: 14/811,457

(22) Filed: Jul. 28, 2015

(65) Prior Publication Data
US 2016/0032591 A1 Feb. 4, 2016

(30) Foreign Application Priority Data

Jul. 30, 2014 (JP) ................................ 2014-155018

(51) Int. Cl.
*E04D 15/04* (2006.01)
*B23P 19/00* (2006.01)
(Continued)

(52) U.S. Cl.
CPC ............ *E04D 15/04* (2013.01); *B23P 19/006* (2013.01); *B23P 19/06* (2013.01); *B23P 19/08* (2013.01);
(Continued)

(58) Field of Classification Search
CPC . E04D 15/04; E04D 2015/047; B23P 19/006; B23P 19/06; B23P 19/08; B25C 5/1693; B25B 21/00; B25B 23/045
See application file for complete search history.

(56) References Cited

U.S. PATENT DOCUMENTS 2,271,028 A * 1/1942 Olson ..................... B23P 19/08
221/273
2,914,781 A * 12/1959 Prutton ................... B23P 19/08
221/21
(Continued)

FOREIGN PATENT DOCUMENTS

EP         1405697 A1    4/2004
JP         57-075786 A   5/1982
(Continued)

OTHER PUBLICATIONS

English Translation of Foreign Patent Document, JP07-076911A.
(Continued)

*Primary Examiner* — Monica S Carter
*Assistant Examiner* — Danny Hong
(74) *Attorney, Agent, or Firm* — Lynette Wylie; Apex Juris, pllc.

(57) ABSTRACT

In a continuous screw tightening machine with washer stacking supply mechanism, in conjunction with retreating of a tightening machine, a washer is placed on a seat surface portion of a washer feeding body of a washer sequential supply mechanism and reliably supplied to a tightening possible position one by one and the one screw is supplied by a screw sequential supply mechanism between the washer and a bit so as to be in concentric arrangement, in conjunction with advancing of the tightening machine, the washer sequential supply mechanism is set to a feeding preparation attitude of the subsequent washer, and the screw sequential supply mechanism is constituted to be set to a feeding preparation attitude of the subsequent screw, and the screw is tightened and fixed together with the washer at the tightening target spot by rotation/driving of the bit advanced to the tightening possible position by a driving machine.

3 Claims, 24 Drawing Sheets

(51) Int. Cl.
  *B23P 19/06* (2006.01)
  *B23P 19/08* (2006.01)
  *B25B 23/04* (2006.01)
  *B25C 5/16* (2006.01)
  *B25B 21/00* (2006.01)

(52) U.S. Cl.
  CPC ............ B25B 21/00 (2013.01); B25B 23/045 (2013.01); B25C 5/1693 (2013.01); B25B 23/04 (2013.01); E04D 2015/047 (2013.01)

(56) References Cited

U.S. PATENT DOCUMENTS

| | | | | |
|---|---|---|---|---|
| 3,226,744 A | * | 1/1966 | Marechal | B23P 19/08 29/788 |
| 3,633,446 A | * | 1/1972 | Tadahira | B25B 21/002 81/55 |
| 3,971,116 A | | 7/1976 | Goodsmith et al. | |
| 4,246,939 A | | 1/1981 | Boegel | |
| 5,299,351 A | * | 4/1994 | Takahashi | B23P 19/001 221/11 |
| 5,347,707 A | | 9/1994 | Beach | |
| 5,566,446 A | * | 10/1996 | Luckhardt | B21J 15/32 227/120 |
| 5,864,937 A | * | 2/1999 | Cecil | B23P 19/08 198/389 |
| 5,960,678 A | * | 10/1999 | Kennedy | B25B 23/04 221/212 |
| 6,736,303 B2 | * | 5/2004 | Bruins | B25C 5/1693 227/110 |
| 6,952,853 B2 | * | 10/2005 | Rahmsdorf | B23B 47/28 7/158 |

FOREIGN PATENT DOCUMENTS

| | | |
|---|---|---|
| JP | 62-107932 A | 5/1987 |
| JP | 07-076911 A | 3/1995 |
| JP | H7-76911 A | 3/1995 |
| JP | 08-277076 A | 8/1996 |
| JP | 2000-190245 A | 7/2000 |
| JP | 2002-508713 A | 3/2002 |
| WO | WO9900221 A1 | 1/1999 |

OTHER PUBLICATIONS

English Translation of Foreign Patent Document, JP62-107932A.
English Translation of Foreign Patent Document, JP2002-508713A.
English Translation of Foreign Patent Document, JP57-075786A.
English Translation of Foreign Patent Document, JP2000-190245A.
English Translation of Foreign Patent Document, JP08-277076A.
Intent to Issue communication under Rule 71(3) EPC for EP15178329.7-1709, dated Jun. 2, 2017, Total of 62 pages.
EP search report for EP151715178329.7-1709, dated Dec. 18, 2015, Total of 7 pages.

* cited by examiner

CONTINUOUS SCREW TIGHTENING MACHINE WITH WASHER STACKING SUPPLY MECHANISM

BACKGROUND OF THE INVENTION

Field of the Invention

The present invention relates to a continuous screw tightening machine with washer stacking supply mechanism and particularly to a continuous screw tightening machine with washer stacking supply mechanism constituted such that, in a state in which a screw penetrates a hole of a washer, the screw and washer can be tightened and fixed at tightening target spots at the same time.

Description of the Related Art

When roofing or the like, for example, the screws and washers need to be tightened at target spots of a roofing member in the state in which the screw penetrates the hole of the washer.

As a continuous screw tightening machine with washer stacking supply mechanism in such fields, a washer distribution fastener screwing machine disclosed in Japanese Patent Laid-Open No. 7-76911 is known.

This washer distribution fastener screwing machine (that is, a screw tightening machine) is constituted so as to individually distribute washers from a similar roofing washer stack capable of being stacked.

That is, this washer distribution fastener screwing machine is constituted to include a base, a shuttle, an elongated stop, a gate and a claw and supplies washers one by one to the shuttle from a lower outlet of the base, and the washer received at the shuttle passes through the gate and is transferred to a predetermined position, and when the shuttle moves in order to receive a subsequent washer again, the previous washer is pressed by the claw so as not to move, and then, the screw is screwed into a center hole of the previous washer by the screwing machine on the base and screwed and fixed at a target spot.

However, in the case of the washer distribution fastener screwing machine in Japanese Patent Laid-Open No. 7-76911, since an entire dimension is large and its weight is also large, a work speed is low and though the washers are stacked at a preparation position, the screw needs to be supplied one by one, which is cumbersome. Moreover, since both the screw and washer at a fastening preparation position cannot be seen from an outside, prevention of defective fastening is difficult. Furthermore, since the screws are supplied manually one by one, usability is poor, and since the washer is pressurized by a weight in some cases, there are problems such as possibility of drop of the washer during transportation.

The problem to be solved by the present invention is that, there is no continuous screw tightening machine with washer stacking supply mechanism which, in a state in which a screw penetrates a hole of a washer, can tighten and fix the screw and washer at a tightening target spot at the same time, continuously and automatically supply the screws and washers required for a tightening work in order and moreover, realize stable supply of the washers one by one and prevent blank striking or double striking of the washer.

SUMMARY OF THE INVENTION

A continuous screw tightening machine with washer stacking supply mechanism according to the present invention has a major characteristic in having a tightening machine body on which a driving machine is mounted, connecting a bit for screw tightening rotated/driven by the driving machine detachably and rotatably and arranged capable of advancing/retreating between a standby position and a tightening possible position by the bit, a tip-end block provided below the tightening machine body, provided with a washer temporary accommodating portion for accommodating one washer capable of being withdrawn downward, and arranged on a tightening target spot, a screw-and-washer supply mechanism body arranged between the tightening machine body and the tip-end block, having an accommodating region for stacking a large number of the washers in stacked arrangement on a rear side and capable of concentric arrangement of screws between the bit and the washer, a washer sequential supply mechanism incorporated in the accommodating region of the screw-and-washer supply mechanism body from a side portion to a lower part and provided with a washer feeding body for engaging a concave portion corresponding to an outer shape of the washer with an outer periphery of the washer and feeding it to the washer temporary accommodating portion, a screw rope magazine accommodating a screw rope to which a large number of the screws are connected by a band-shaped member at a constant interval capable of being fed out and detachably arranged on a rear part side of the screw-and-washer supply mechanism body, and a screw sequential supply mechanism incorporated in the screw-and-washer supply mechanism body, in which, in conjunction with retreating of the tightening machine body, the washer is automatically supplied to the washer temporary accommodating portion by the washer sequential supply mechanism, one of the screws connected to the screw rope from the screw rope magazine is automatically supplied by the screw sequential supply mechanism so as to be concentrically arranged between the washer and the bit, in conjunction with advancing of the tightening machine body, the washer sequential supply mechanism is automatically set to a feeding preparation attitude for the subsequent washer, and the screw sequential supply mechanism is automatically set to a feeding preparation attitude for the subsequent screw.

According to the invention described in claim 1, the continuous screw tightening machine with washer stacking supply mechanism is constituted such that, in conjunction with the retreating of the tightening machine body, the washer is supplied to the washer temporary accommodating portion by the washer feeding body of the washer sequential supply mechanism, the one screw connected to the screw rope from the screw rope magazine is supplied by the screw sequential supply mechanism so as to be arranged concentrically between the washer and the bit, and in conjunction with the advancing and the tightening operation of the tightening machine body, the washer sequential supply mechanism is set to the feeding preparation attitude for the subsequent washer, and the screw sequential supply mechanism is set to the feeding preparation attitude for the subsequent screw and thus, the continuous screw tightening machine with washer stacking supply mechanism capable of sequentially and continuously performing the screw and washer tightening operation efficiently can be realized and provided.

According to the present invention described in claim 2, the washers are stacked and stored in the accommodating region inside the screw-and-washer supply mechanism body and major parts of the screw sequential supply mechanism and the washer sequential supply mechanism are stored in the screw-and-washer supply mechanism body and thus, there is substantially no member expanding outward obstructing the screw-and-washer supply mechanism body, the machine can be made compact and light-weighted as a whole, and the continuous screw tightening machine with washer stacking supply mechanism which can greatly contribute to improvement of a working speed can be realized and provided.

According to a further feature of the present invention, the washer temporary accommodating portion provided with a movable latch portion regulating movement of the washer loaded in a tip-end block in a direction opposite to the feeding direction is provided, and a seat surface portion provided with an arc-shaped contact portion corresponding to an outer shape of the washer and on which the washer is placed is provided in the washer feeding body and thus, feeding of the washers to the washer temporary accommodating portion by the washer feeding body can be performed reliably one by one and therefore, the continuous screw tightening machine with washer stacking supply mechanism which can prevent washer clogging caused by double feeding or the like and moreover, can also prevent washer blank tightening or washer double tightening can be realized and provided.

According to a yet further feature of the present invention, the washer feeding body is constituted by including a return claw covering a part of an outer peripheral upper surface of the washer on the seat surface portion and thus, the continuous screw tightening machine with washer stacking supply mechanism which can perform feeding of the washer to the washer temporary accommodating portion by the washer feeding body one by one more stably and reliably can be realized and provided.

According to still another feature of the present invention since a single a feeding of the washer is performed not by the tightening machine body but by a manual operation of a single operation lever interlocking with the washer sequential supply mechanism, the washer single body can be set to a tightening possible position after only the washers are emptied first, and the continuous screw tightening machine with washer stacking supply mechanism which exerts an effect that only the washer can be fed when the screw and the washer are loaded can be realized and provided.

A still further feature according to the invention, is an effect exerted similar to that of the invention described in claim 2, and since the screw-and-washer supply mechanism body includes a lid body opening/closing a side surface of the accommodating region of the large number of washers in the stacked arrangement and a washer pressing piece for pressing an uppermost part of the large number of washers in the stacked arrangement, the continuous screw tightening machine with washer stacking supply mechanism which can be set in the accommodating region simply and easily and has no concern of a drop of the washer can be realized and provided.

DETAILED DESCRIPTION OF THE PREFERRED EMBODIMENT

Figure 1:
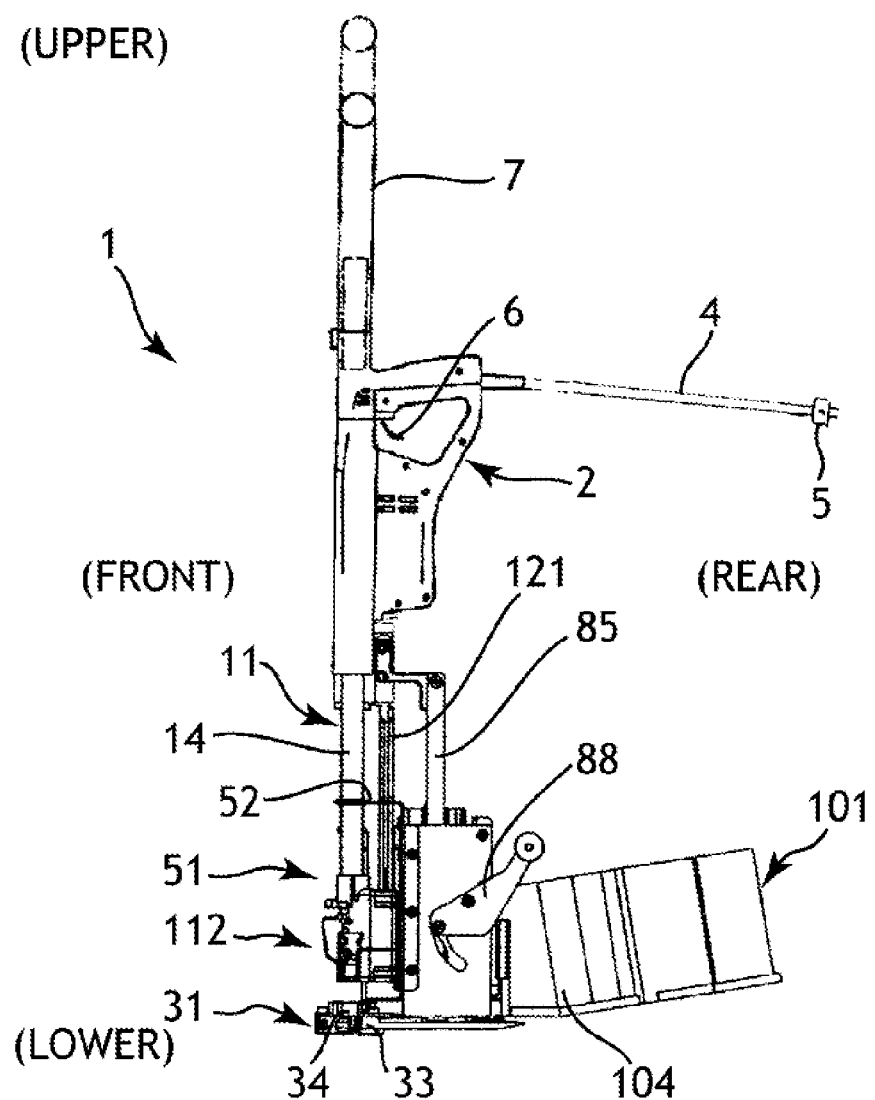
FIG. 1 is an outline right side view illustrating an entire constitution of a continuous screw tightening machine with washer stacking supply mechanism according to an embodiment of the present invention.

The present invention achieves the object of realizing and providing a continuous screw tightening machine with washer stacking supply mechanism which, in a state in which a screw penetrates a hole of a washer, can tighten and fix the screw and the washer at a tightening target spot at the same time, can automatically supply the screw and the washer required for a tightening work in order and continuously, and moreover, can realize stable supply of the washers one by one and prevent blank striking or double striking of the washers by a constitution having a tightening machine body on which a driving machine is mounted and connecting a bit for screw tightening rotated/driven by the driving machine detachably and rotatably, a tightening machine body guide mechanism advancing/retreating the tightening machine body between a standby position and an advanced position where the bit is advanced so as to be arranged at a position capable of tightening a screw, a tip-end block provided below the tightening machine body guide mechanism and provided with a washer temporary accommodating portion for accommodating one washer having a hole through which the screw is inserted, capable of being withdrawn downward and provided with a movable latch portion regulating movement of the loaded washer in a direction opposite to a feeding direction and a base plate capable of placing a large number of the washers in stacked arrangement, and arranged on a tightening target spot, a screw-and-washer supply mechanism body arranged between the tightening machine body guide mechanism and the tip-end block and having an accommodating region for a large number of the washers in stacked arrangement on a rear side, a washer sequential supply mechanism provided with a washer feeding pressing rod interlocked with the tightening machine body, a rotating lever incorporated in the accommodating region of the screw-and-washer supply mechanism body from a side portion to a lower part and rotating in conjunction with this washer feeding pressing rod, and a washer feeding body for automatically supplying the washer on a lowermost stage in the large number of the washers stacked on the base plate and accommodated in the screw-and-washer supply mechanism body to the washer temporary accommodating portion with retreating of the washer feeding pressing rod and provided with a seat surface portion provided with an arc-shaped contact portion corresponding to an outer shape of the washer and on which the washer is placed, and automatically supplying the washer on the seat surface portion to the washer temporary accommodating portion by sliding it on the base plate of the tip-end block by this washer feeding body and automatically returning the washer feeding body interlocked with the rotating lever in conjunction with the advancing of the washer feeding pressing rod to the advanced position to a supply preparation position of the subsequent one washer, a screw rope magazine accommodating a screw rope to which a large number of the screws are connected at a constant interval by a band-shaped member, capable of being fed out and detachably arranged on a rear part side of the screw-and-washer supply mechanism body, a screw sequential supply mechanism provided with a screw feeding pressing rod for interlocking with the tightening machine body, and a feeding claw for the screw incorporated in the screw-and-washer supply mechanism body and moving in conjunction with the screw feeding pressing rod, and automatically supplying the subsequent screw in order so as to be concentrically arranged by the feeding claw between it and the hole of the washer by automatically moving the feeding claw to a supply preparation position of one of the screws in each screw of the screw rope supplied from the screw rope magazine with the advancing of the screw feeding pressing rod in conjunction with the advancing of the tightening machine body to a position capable of tightening with retreating of the screw feeding pressing rod in conjunction with the retreating of the tightening machine body to the standby position, and by means of rotation/driving of the bit advanced to the tightening possible position by the driving machine, the screw is removed downward from the washer temporary accommodating portion together with the washer whose position is regulated by the movable latch portion and tightened and fixed to the tightening target spot.

Embodiment

A continuous screw tightening machine with washer stacking supply mechanism according to an embodiment of the present invention will be described below in detail by referring to the attached drawings.

Figure 2:
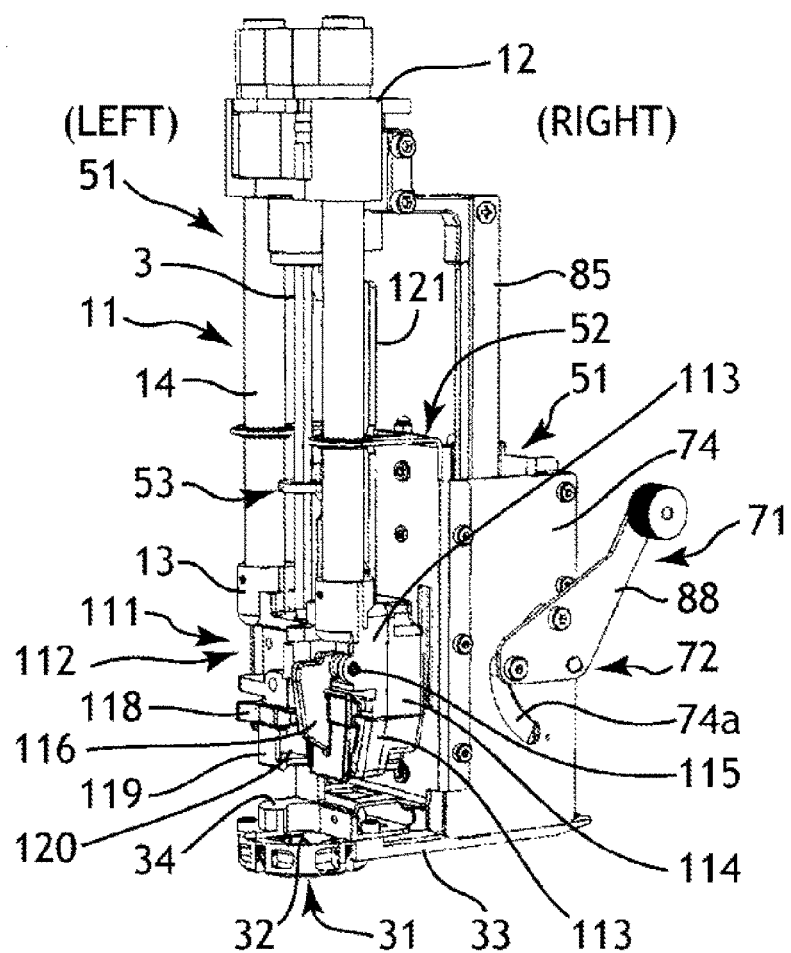
FIG. 2 is an outline perspective view illustrating a tightening machine body in the continuous screw tightening machine with washer stacking supply mechanism according to the embodiment, a tightening machine body guide mechanism in a state in which a screw rope magazine has been removed, a screw-and-washer supply mechanism body, and a tip-end block.
Figure 3:
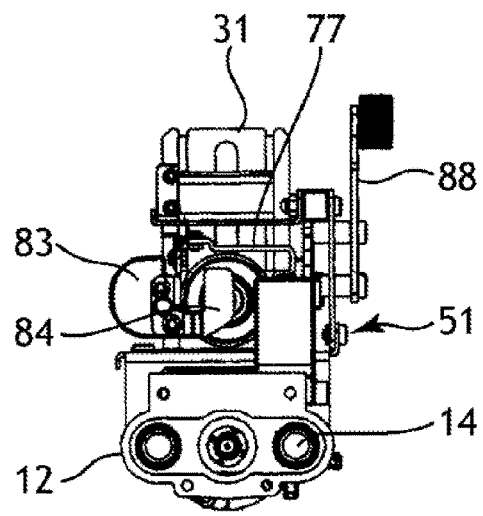
FIG. 3 is an outline plan view of the tightening machine body guide mechanism in the continuous screw tightening machine with washer stacking supply mechanism according to the embodiment, the screw-and-washer supply mechanism body, and the tip-end block.
Figure 4:
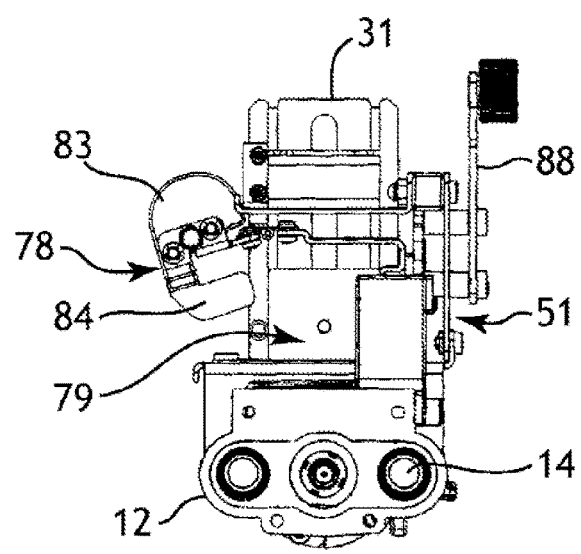
FIG. 4 is an outline plan view of the tightening machine body guide mechanism in the continuous screw tightening machine with washer stacking supply mechanism according to the embodiment, the screw-and-washer supply mechanism body in a state in which a lid body is open, and the tip-end block.
Figure 12:
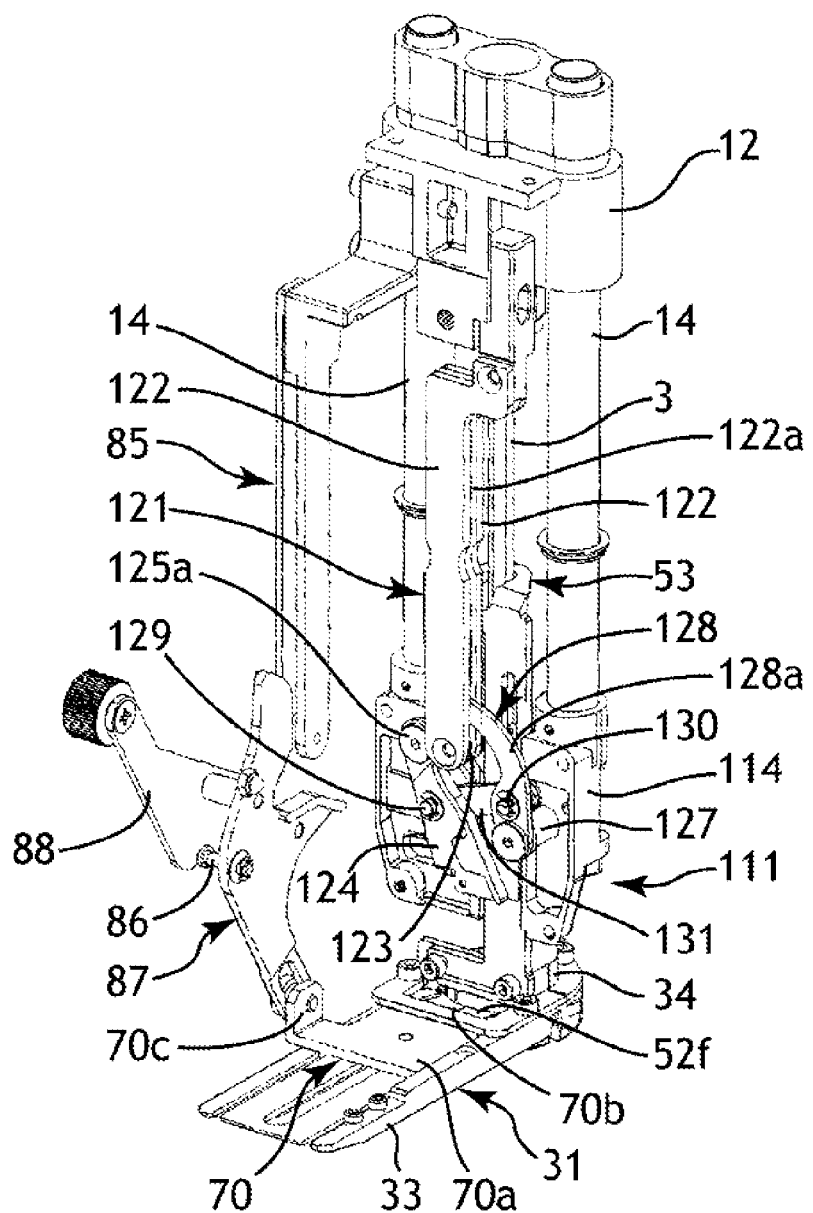
FIG. 12 is an outline perspective view of essential parts of the screw sequential supply mechanism in the continuous screw tightening machine with washer stacking supply mechanism according to the embodiment and the washer sequential supply mechanism when seen from diagonally rear.

The continuous screw tightening machine with washer stacking supply mechanism 1 according to the embodiment has, as illustrated in FIGS. 1 and 2, a tightening machine body 2 on which a driving machine (not shown) is mounted and connecting a bit 3 for screw tightening rotated/driven by the driving machine detachably and rotatably, a tightening machine body guide mechanism 11 advancing/retreating the tightening machine body 2 between a standby position and an advanced position where the bit 3 is advanced so as to be arranged at a position capable of tightening a screw S, a tip-end block 31 provided below the tightening machine body guide mechanism 11 and provided with a washer temporary accommodating portion 32 for accommodating one washer W having a hole Wa through which the screw S is inserted, capable of being withdrawn downward and a base plate 33 capable of placing a large number of the washers W in stacked arrangement, and arranged on a tightening target spot 100, a screw-and-washer supply mechanism body 51 arranged between the tightening machine body guide mechanism 11 and the tip-end block 31, a washer sequential supply mechanism 71 incorporated in the screw-and-washer supply mechanism body 51 and supplying the washer W on a lowermost stage in the large number of washers W stacked on the base plate 33 and accommodated in the screw-and-washer supply mechanism body 51 to a washer temporary accommodating portion 32 by sliding it on the base plate 33 of the tip-end block 31 by a washer feeding body 70 as illustrated in FIG. 12, a screw rope magazine 101 accommodating a screw rope 102 to which a large number of the screws S are connected at a constant interval by a band-shaped member 103, capable of being fed out and detachably arranged on a rear part side of the screw-and-washer supply mechanism body 51, a screw feeding pressing rod for interlocking with the tightening machine body, and a feeding claw for the screw incorporated in the screw-and-washer supply mechanism body 51 and moving in conjunction with the screw feeding pressing rod are provided, and a screw sequential supply mechanism 111 incorporated in the screw-and-washer supply mechanism body 51 and supplying each screw S of the screw rope 102 supplied from the screw rope magazine 101 one by one in order so as to be arranged concentrically in a region between a tip end of the bit 3 and the hole Wa of the washer W in conjunction with advancing of the bit 3 in the tightening machine body 2 to a tightening possible position.

The tightening machine body 2 protrudes the bit 3 for tightening the screw S perpendicularly downward and allows a grip handle 7 for a worker to be detachably attached as necessary on an upper part side of this tightening machine body 2.

Moreover, the tightening machine body 2 incorporates a driving machine (motor) for rotating/driving the bit 3, a decelerator, a clutch and the like, though not shown, and is constituted such that the bit 3 is detachably attached to the clutch. The bit 3 is a member corresponding to a driver which is a general tool and is formed of a shaft having a hexagonal section.

Figure 5:
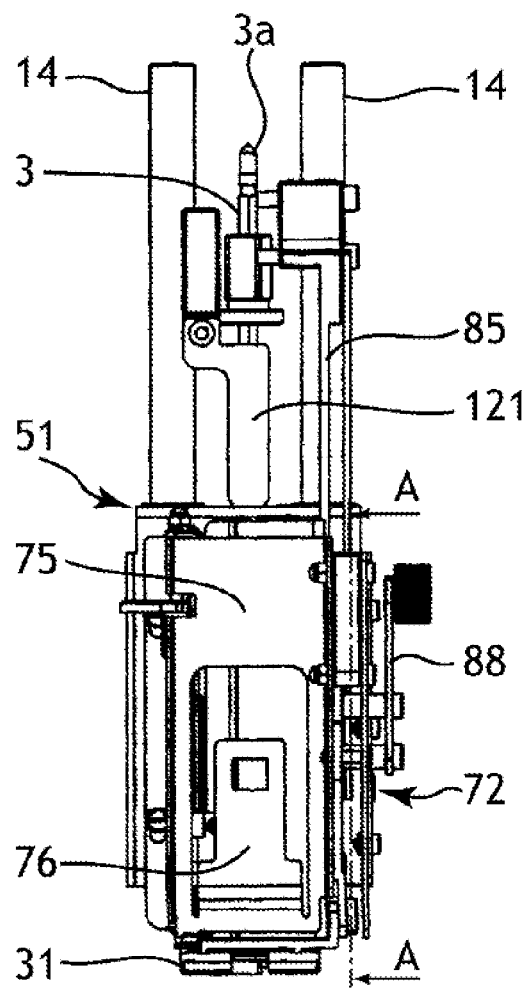
FIG. 5 is an outline rear view of the tightening machine body guide mechanism in the continuous screw tightening machine with washer stacking supply mechanism according to the embodiment, the screw-and-washer supply mechanism body, and the tip-end block.
Figure 6:
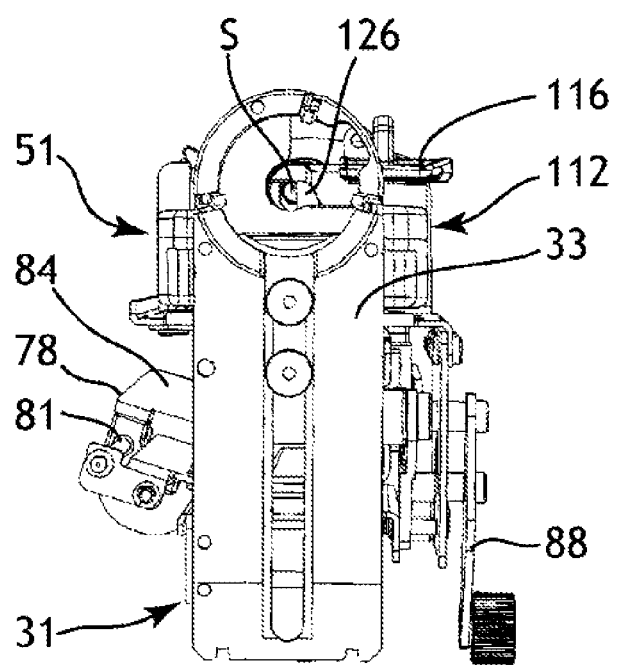
FIG. 6 is an outline bottom view of the tip end block in the continuous screw tightening machine with washer stacking supply mechanism according to the embodiment and the screw-and-washer supply mechanism body.
Figure 7:
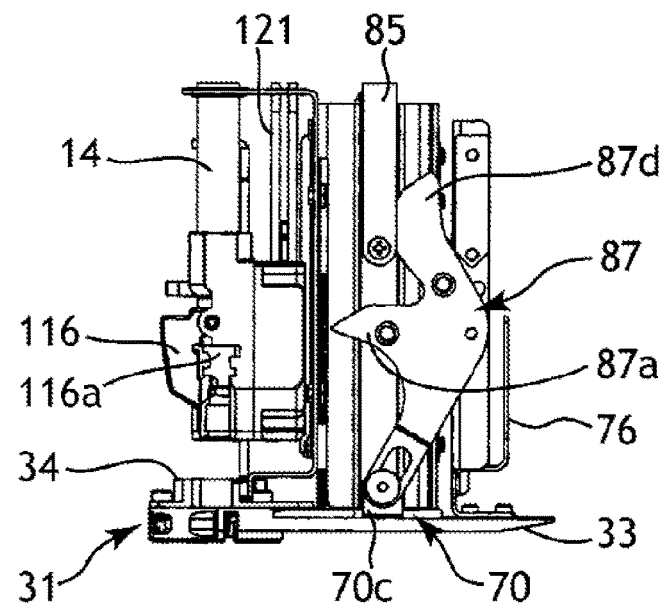
FIG. 7 is an A-A line sectional view of FIG. 5.
Figure 8:
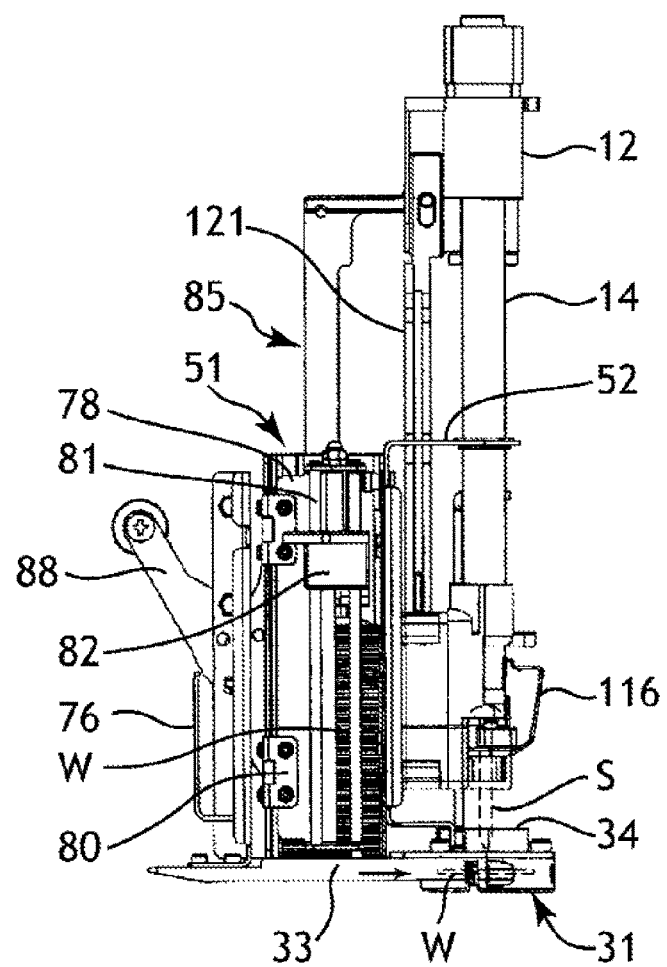
FIG. 8 is an outline left side view of the tightening machine body guide mechanism in the continuous screw tightening machine with washer stacking supply mechanism according to the embodiment, the screw-and-washer supply mechanism body, and the tip-end block.
Figure 9:
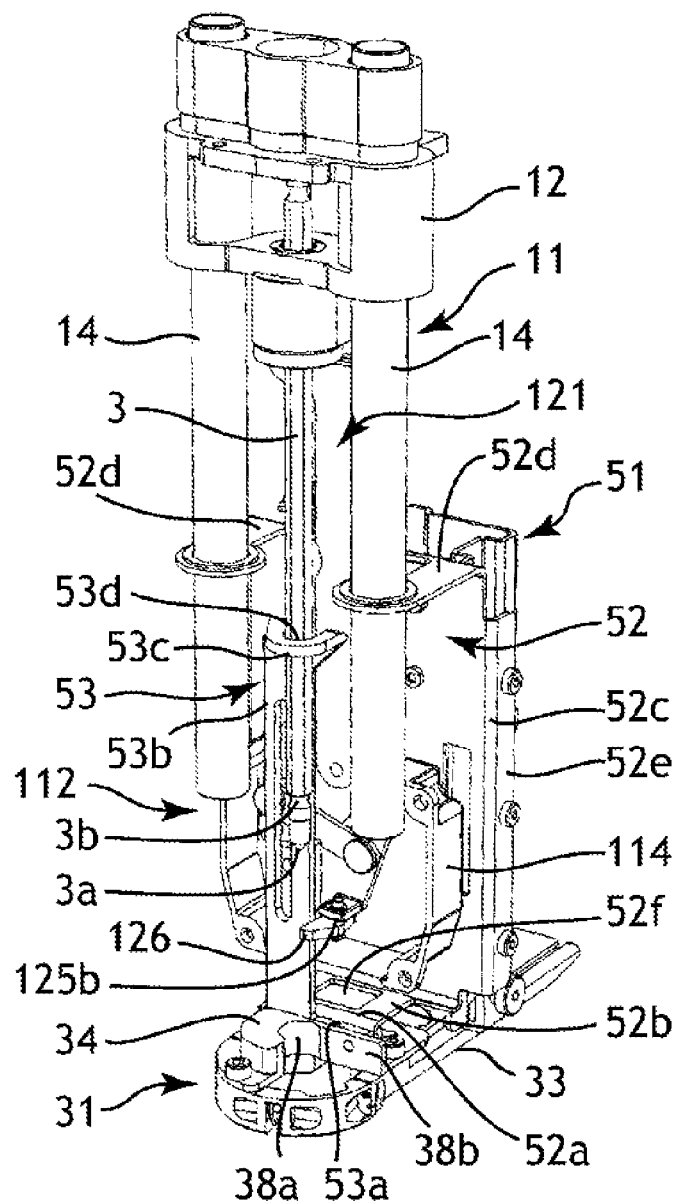
FIG. 9 is an outline perspective view of an internal constitution of the screw-and-washer supply mechanism body in the continuous screw tightening machine with washer stacking supply mechanism according to the embodiment when seen from diagonally front.

On both ends of this bit 3, an engagement groove on a head portion of the screw S or an engagement projection portion 3a as illustrated in FIGS. 5 and 9 to be engaged with an engagement groove such as a plus groove, for example, is formed, and a groove 3b so as to be meshed with a chuck arranged on a lower part of a clutch close to this engagement projection portion 3a is formed in a circumferential direction. FIG. 9 illustrates a state in which a lower end of the bit 3 is exposed.

The bit 3 can be used by switching a longitudinal position in accordance with abrasion of the engagement projection portions 3a on the both ends thereof, and if the engagement projection portions 3a are both worn, it is replaced by the new bit 3 and used.

Moreover, the tightening machine body 2 is provided with, as illustrated in FIG. 1, a trigger switch 6 to which a power cable 4 with an insertion plug 5 to be connected to a commercial power source for required power supply to the driving machine is connected and for starting the driving machine.

The tightening machine body guide mechanism 11 is provided with, as illustrated in FIG. 2, an upper slide mounting portion 12 to be attached to the lower part of the tightening machine body 2 and a lower mounting portion 13 mounted on an upper part of the screw feeding unit 112 which will be described later.

The lower mounting portion 13 mounted on the upper part of the substantially box-shaped screw feeding unit 112 constituting the screw sequential supply mechanism 111 provided integrally on a front surface of the screw-and-washer supply mechanism body 51 and a pair of guide poles 14 and 14 in parallel arrangement having the upper part side penetrating slidably on the upper slide mounting portion 12 and the lower end side fastened to the lower mounting portion 13 are provided.

That is, the upper slide mounting portion 12 is constituted so as to slide vertically by being guided by the pair of guide poles 14 and 14 in a state in which the tightening machine body 2 is mounted.

Moreover, at a center position of the pair of guide poles 14 and 14, the bit 3 protruded from the tightening machine body 2 is arranged perpendicularly downward and is constituted so as to vertically move with the tightening machine body 2 and advance/retreat (vertically move) the tightening machine body 2 itself between a standby position illustrated in FIG. 1 and an advanced position advanced so that the bit 3 is arranged at a position capable of tightening the screw S (which will be described later).

Inside the pair of guide poles 14 and 14, an elastic material such as a coil spring or the like urging the tightening machine body 2 to the standby position side at all times is incorporated, though not shown.

Subsequently, the tip-end block 31 will be described by referring to FIGS. 2, 9, 14, and 15.

The tip-end block 31 is provided below the tightening machine body guide mechanism 11 and includes the washer temporary accommodating portion 32 presenting a circular hole shape accommodating the one washer W having the hole Wa through which the screw S is inserted, capable of being withdrawn downward, the base plate 33 which is integral with this washer temporary accommodating portion 32 and on which the large number of washers can be placed in stacking arrangement, a bit guide body 34 fastened to the base plate 33 on the upper part of the washer temporary accommodating portion 32 in this base plate 33, a slide recess portion 35 provided on an upper surface of the base plate 33 and on a rear part side from the bit guide body 34 and for causing the washer feeding body 70 to slide in a length direction of the base plate 33, and a long hole 36 provided at a center part in the length direction of this slide recess portion 35 and guiding the washer feeding body 70.

Moreover, on a circular peripheral wall of the washer temporary accommodating portion 32 of the tip-end block 31, a latch portion 37 temporarily supporting the washer W and removing the washer W to below the washer temporary accommodating portion 32 when a downward pressing force acts is arranged.

The bit guide body 34 includes a substantially semicircular concave portion 38a through which the bit 3 can be inserted above the washer temporary accommodating portion 32 and a perpendicular standing portion 38b.

Subsequently, the screw-and-washer supply mechanism body 51 will be described in detail by referring mainly to FIGS. 2, 9, and 10.

The screw-and-washer supply mechanism body 51 is located at a lower part position of the tightening machine body guide mechanism 11 and on an upper part of the tip-end block 31 and is supported in perpendicular arrangement and moreover is constituted so as to detachably arrange the screw rope magazine 101.

The screw-and-washer supply mechanism body 51 is supported in perpendicular arrangement by the tip-end block 31 and as illustrated in FIG. 2, constituted to include the washer sequential supply mechanism 71 provided with a washer feeding unit 72 having a square cylindrical appearance and the screw sequential supply mechanism 111 provided with the screw feeding unit 112.

Figure 10:
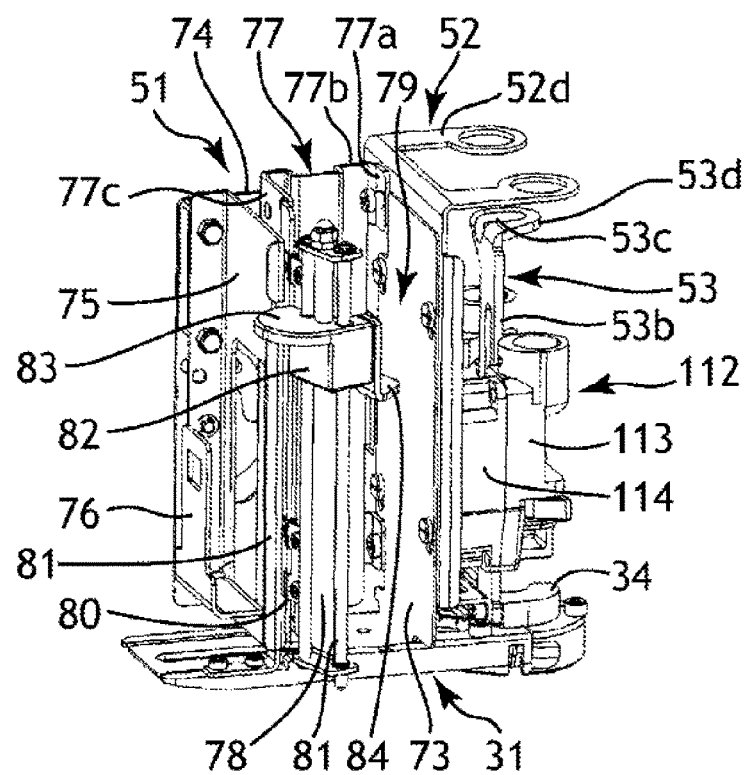
FIG. 10 an outline perspective view of an internal constitution of the screw-and-washer supply mechanism body in the continuous screw tightening machine with washer stacking supply mechanism according to the embodiment when seen from diagonally rear.

The screw-and-washer supply mechanism body 51 has, as illustrated in FIGS. 9 and 10, a pole support body 52 supported in perpendicular arrangement by the tip-end block 31 and a bit guide rod 53 guiding the bit 3 similarly supported in the perpendicular arrangement by the tip-end block 31 in a loose-fit state.

The pole support body 52 is constituted so as to have a perpendicular piece 52a bent and formed on a lower end portion by the perpendicular standing portion 38b of the bit guide body 34 fixed/supported with a lower end portion 53a of the bit guide rod 53 and a horizontal piece 52b integral with the perpendicular piece 52a extended horizontally, and a wall-surface forming plate portion 52c is stood perpendicularly upward from an end portion of this horizontal piece 52b and moreover, the pair of guide poles 14 and 14 are supported in the perpendicular arrangement by a pair of guide pole support pieces 52d and 52d protruded horizontally on the pair of guide poles 14 and 14 sides from upper end both corner portions of the wall-surface forming plate portion 52c in a state in which predetermined positions of the pair of guide poles 14 and 14 are penetrated.

In the horizontal piece 52b, a square hole 52f through which the screw feeding pressing rod 121 is inserted is provided.

Moreover, the bit guide rod 53 is provided with a perpendicular portion 53b stood perpendicularly upward so as to be in parallel arrangement with the bit 3 from the lower end portion 53a and in a state penetrating the screw feeding unit 112 and a bit loose-fit piece 53c bent from an upper end of the perpendicular portion 53b and provided with a through hole 53d through which the bit 3 is penetrated without contact.

Then, the screw feeding unit 112 is arranged on a front side of the wall-surface forming plate portion 52c of the pole support body 52 and the washer feeding unit 72 constituting the washer sequential supply mechanism 71 on a rear side.

The washer feeding unit 72 is provided with a front wall surface plate 73 fixed to the wall-surface forming plate portion 52c by a screw, a right-side wall surface plate 74 fixed by a screw to a right-side bent piece 52e of the wall-surface forming plate portion 52c, a rear-side wall surface plate 75 fixed to a rear part side of the right-side side surface plate 74 and having an attachment receiving piece 76 for the screw rope magazine 101 provided on the rear part side, and a substantially U-shaped partition plate 77 in fixed arrangement at a predetermined interval inside the right-side wall surface plate 74 and the rear-side wall surface plate 75.

The partition plate 77 is, as illustrated in FIG. 10, integrally molded by a front-side mounting plate portion 77a mounted in perpendicular arrangement to a rear surface right side of the front wall surface plate 73 by a screw, a right-side partition plate portion 77b in parallel arrangement at a predetermined interval with the right-side wall surface plate 74, and a rear-side partition plate portion 77c in parallel arrangement at a predetermined interval with the rear-side wall surface plate 75.

Moreover, the washer feeding unit 72 is mounted capable of being opened/closed by using a pair of hinges 80 on a left-side edge portion of the rear-side partition plate portion 77c and is provided with a lid body 78 for substantially closing or opening an open region between the front wall surface plate 73 and the rear-side partition plate portion 77c.

By means of such constitution, a substantially cuboid space defined by the front wall surface plate 73, the right-side partition plate portion 77b, the rear-side partition plate portion 77c, and the lid body 78 is constituted to function as an accommodating region 79 of the washer W.

On an outer side of the lid body 78 (opposite side of the accommodating region 79), a pair of guide rods 81 in parallel arrangement are mounted in fixed arrangement to perpendicular arrangement, a moving box body 82 provided with a knob 83 is supported by the pair of guide rods 81, capable of vertical movement, and moreover, a washer pressing piece 84 is constituted to be mounted on the moving box body 82 is faced with an inside the accommodating region 79 so that an uppermost end surface of the washer W stacked in the accommodating region 79 is pressed by the washer pressing piece 84.

Moreover, a major part of the washer sequential supply mechanism 71 is constituted to be accommodated in a region between the right-side wall surface plate 74 and the right-side partition plate portion 77b.

Subsequently, a specific constitution example of the washer sequential supply mechanism 71 will be described by referring to FIGS. 11 and 12.

Figure 11:
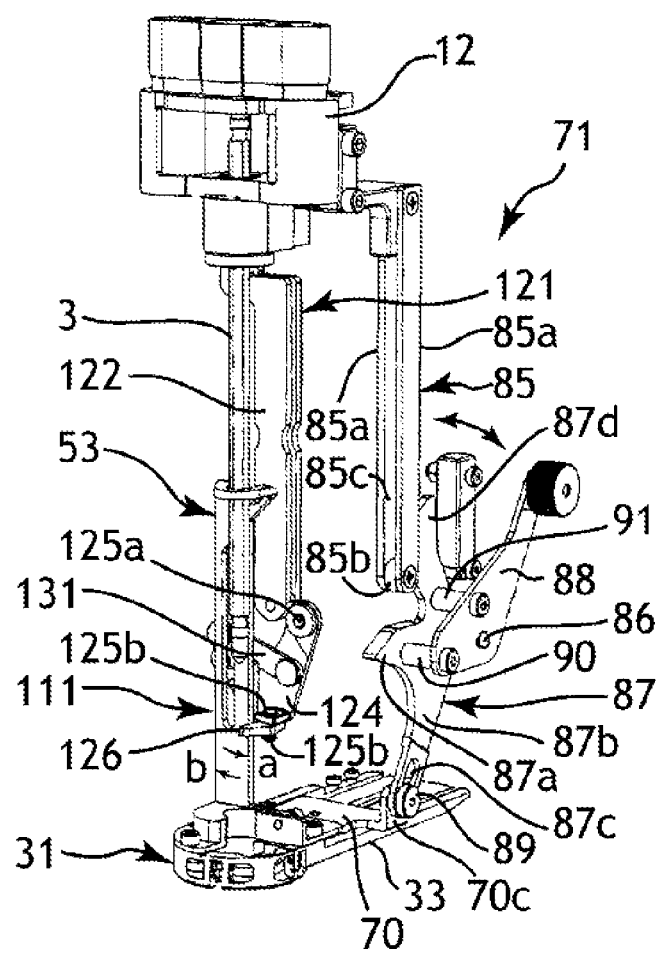
FIG. 11 is an outline perspective view of essential parts of a screw sequential supply mechanism and a washer sequential supply mechanism in the continuous screw tightening machine with washer stacking supply mechanism according to the embodiment when seen from diagonally front.

The washer sequential supply mechanism 71 has, as illustrated in FIGS. 2, 11, 10, and 12, a washer feeding pressing rod 85 connecting an upper end portion to the upper slide mounting portion 12 and having a lower end side faced with a region between the right-side wall surface plate 74 and the right-side partition plate portion 77b, a rotating lever 87 pivotally supported rotatably in an arrow direction illustrated in FIG. 11 by a shaft portion 86 mounted in horizontal arrangement between the right-side wall surface plate 74 and the right-side partition plate portion 77b, engaged with the washer feeding pressing rod 85, and connected to the washer feeding body 70 arranged on the base plate 33 so that this washer feeding body 70 can slide on the base plate 33, a single operation lever 88 arranged on an outer side of the right-side wall surface plate 74 and interlocked with the rotating lever 87.

The washer feeding body 70 is provided with, as illustrated in FIG. 12, a slide plate portion 70a having a substantially rectangular shape on a plan view, an arc-shaped concave portion 70b corresponding to an outer shape of the washer W provided on a front end side of this slide plate portion 70a, and a feeding receiving piece 70c provided in standing arrangement on a rear end corner portion of the slide plate portion 70a.

The washer feeding pressing rod 85 has, as illustrated in FIGS. 11 and 12, a double structure having two suspended plates 85a having upper end portions mounted on the upper slide mounting portion 12 so as to have a gap 85c between them, and a connecting ring 85b connecting them is fastened to lowermost portions of the two suspended plates 85a by using a bolt and a tap, not shown.

The rotating lever 87 is formed so as to protrude a receiving piece portion 87a to which the connecting ring 85b is brought into contact when the washer feeding pressing rod 85 is lowered, a slide operation piece portion 87b provided with an engagement long hole 87c through which an engagement pin 89 mounted on the feeding receiving piece 70c of the washer feeding body 70 is penetrated, and a returning piece portion 87d having a protruding end side advancing into the gap 85c of the washer feeding pressing rod 85 when the washer feeding pressing rod 85 is raised, brought into contact with the connecting ring 85b located at a lower end thereof, and rotating the rotating lever 87 so as to return to an initial position using the shaft portion 86 as a pivot shaft radially in three directions when seen from the shaft portion 86.

The single operation lever 88 and the rotating lever 87 are, as illustrated in FIGS. 2, 11, and 12, arranged so as to penetrate an arc-shaped long hole 74a provided in the right-side wall surface plate 74 and connected by two connecting rods 90 and 91 in arrangement corresponding to this arc-shaped long hole 74a and are constituted such that the washer feeding body 70 can slide on the base plate 33 even by manually operating only the single operation lever 88 in the arrow direction.

Subsequently, the screw rope magazine 101 will be described by referring to FIGS. 1, 17, 18, and 19.

The screw rope magazine 101 has a circular box-shaped magazine body 104 accommodating the screw rope 102 to which the large number of screws S is connected by the band-shaped member 103 at a constant interval, capable of being fed out and is constituted to be detachably attached to the attachment receiving piece 76 provided on the rear-side wall surface plate 75 illustrated in FIG. 10 of the washer feeding unit 72 in the screw-and-washer supply mechanism body 51 through a bracket 105b provided on one end of this magazine body 104.

Figure 18:
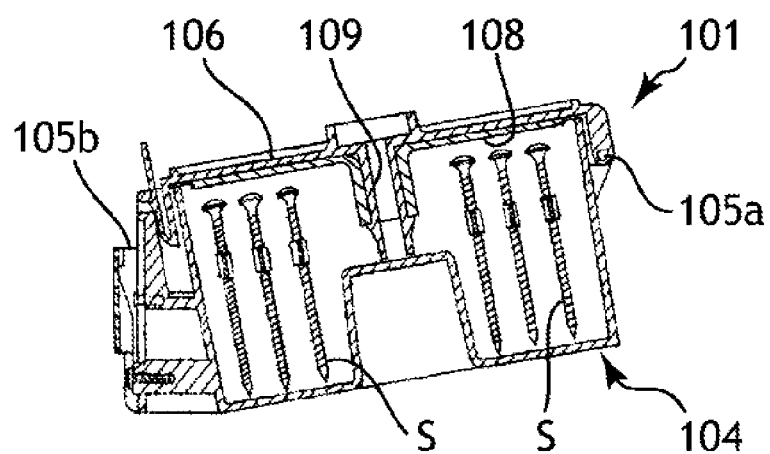
FIG. 18 is an outline sectional view illustrating the screw rope magazine in the continuous screw tightening machine with washer stacking supply mechanism according to the embodiment.
Figure 19:
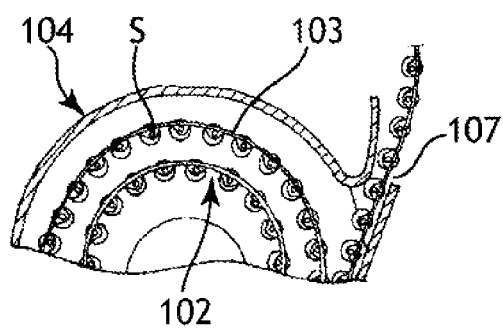
FIG. 19 is a partial sectional view illustrating a state in which the screw rope is fed out of the screw rope magazine in the continuous screw tightening machine with washer stacking supply mechanism according to the embodiment.

The magazine body 104 has, as illustrated in FIGS. 18 and 19, an outer lid 106 mounted on a part of its opening portion, capable of being opened/closed through a hinge 105a and has a take-out port 107 for taking out the screw rope 102 is also opened in a part of the magazine body 104 in the circumferential direction.

Inside this magazine body 104, the wound screw rope 102 is accommodated, and one end of the screw rope 102 is led out to an outside through the taking-out port 107, and the screw rope 102 is constituted to be fed in order to the screw sequential supply mechanism 111.

Moreover, in the embodiment of the present invention, an inner lid 108 is mounted inside this magazine body 104, capable of being reversed, so that the screws S with different lengths, that is, two types of the screws S, for example, can be accommodated therein.

This inner lid 108 has a boss 109 protruded at an inner center part of the outer lid 106 and is mounted in a snap fixing mode so that it can be attached from any direction in its shaft core direction with respect to this boss 109.

Subsequently, a specific constitution example of the screw sequential supply mechanism 111 will be described by referring to FIGS. 2, 11, 12, and 16.

The screw sequential supply mechanism 111 has the screw feeding unit 112 mounted on a front surface of the screw-and-washer supply mechanism body 15 and above the tip-end block 31 and on the lower mounting portion 13.

The screw feeding unit 112 is formed having a substantially cuboid box shape in which a front cover body 113 and a rear cover body 114 are closely connected to each other.

On a front surface side of this front cover body 113, a screw guide body 116 rotating in a perpendicular direction and in a longitudinal direction by a shaft portion 115 in horizontal fixed arrangement using this shaft portion 115 as a pivot shaft, a screw pressing claw body 118 reciprocating and rotating in the horizontal direction by a shaft portion 117 in perpendicular fixed arrangement by using this shaft portion 117 as a pivot shaft, and a screw rope insertion body 119 having an insertion hole 120 through which the band-shaped member 103 fastened to a lower side position of the screw pressing claw body 118 is inserted are arranged.

The screw guide body 116 is urged to the front cover body 113 side by a coil spring, not shown, arranged on the shaft portion 115.

Moreover, the screw pressing claw body 118 is urged in a counterclockwise direction when seen from an upper surface by a coil spring, not shown, arranged on the shaft portion 117.

Figure 16:
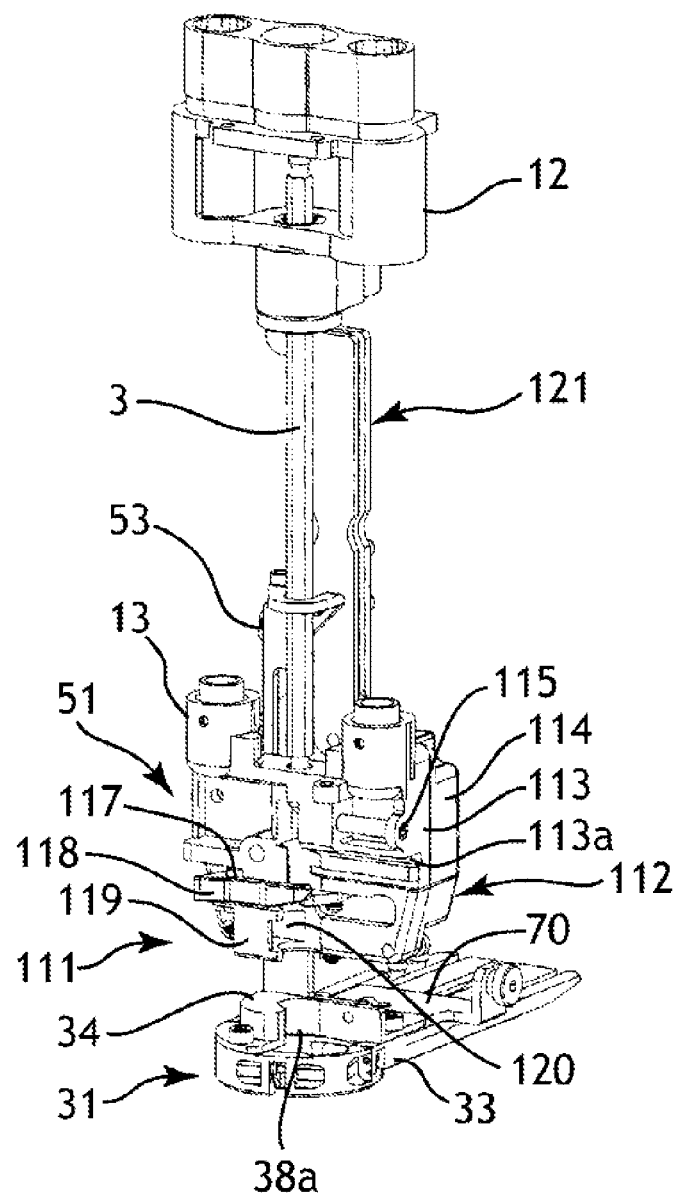
FIG. 16 is an outline perspective view illustrating a part of a screw sequential supply mechanism in the continuous screw tightening machine with washer stacking supply mechanism according to the embodiment.

Moreover, on an inner surface on the front cover body 113 side of the screw guide body 116, a U-shaped screw head passing groove 116a for guiding and passing a head portion of the screw S is provided, and moreover, at a position corresponding to the screw head passing groove 116a of the front cover body 113, as illustrated in FIG. 16, a U-shaped screw head passing groove 113a corresponding to the screw head passing groove 116a is provided.

Figure 17:
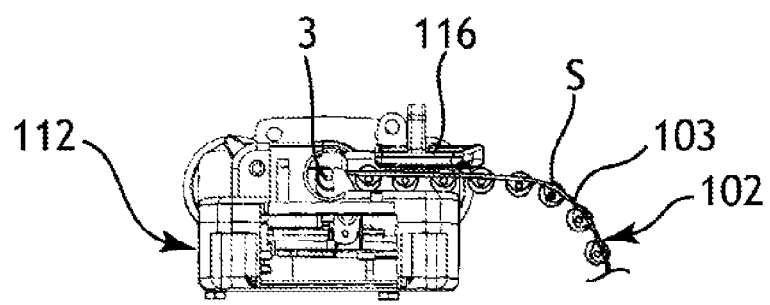
FIG. 17 is an outline bottom view illustrating a connection state of a screw rope to a screw feeding unit in the continuous screw tightening machine with washer stacking supply mechanism according to the embodiment.

Then, as also illustrated in FIG. 17, the band-shaped member 103 and the screw S of the screw rope 102 is attached between the front cover body 113 and the screw guide body 116, and constituted such that the screw heads of the large number of screws S are passed between the screw head passing groove 113a and the screw head passing groove 116a.

Inside the front cover body 113 and the rear cover body 114, a main constituent element of the screw sequential supply mechanism 111 is arranged.

A specific constitution example of the screw sequential supply mechanism 111 will be described.

The screw sequential supply mechanism 111 is provided with, as illustrated in FIGS. 11 and 12, the screw feeding pressing rod 121 having an upper end portion connected to the upper slide mounting portion 12 and a lower end portion faced with an inside the screw feeding unit 112.

The screw feeding pressing rod 121 has a double structure having two suspended plates 122 and 122 having upper end portions mounted on the upper slide mounting portion 12 so as to have a gap 122a between them, and a connecting ring 123 connecting them is fastened to lowermost portions of the two suspended plates 122 and 122 by a bolt and a tap, not shown.

Moreover, the screw sequential supply mechanism 111 is provided with, as illustrated in FIGS. 11 and 12, a rotating lever 124 supported rotatably in the perpendicular direction by a shaft portion 125a mounted on the rear cover body 114 below the connecting ring 123 of the screw feeding pressing rod 121, a feeding claw for the screw S, protruded rotatably in the horizontal direction by a shaft portion 125b mounted in perpendicular arrangement on a lower end portion of this rotating lever 124, a return lever 128 having a lower end portion rotatably supported by a shaft portion 127 mounted on the rear cover body 114 and having an engagement projecting piece 128a having a bow shape protruding upward, for example, faced with an inside of the gap 122a on an upper side of the connecting ring 123, and a link lever 131 having one end side rotatably connected to the rotating lever 124 by a shaft portion 129 and the other end side rotatably connected to the return lever 128 by a shaft portion 130 and interlocking the rotating lever 124 and the return lever 128.

The feeding claw 126 is constituted so as to rotate only in one direction, that is, to rotate when moving to a feeding preparation position of the screw S (an arrow a direction illustrated in FIG. 11) and not to rotate when moving to a feeding position of the screw S (an arrow b direction illustrated in FIG. 11).

A right-side end edge portion of the rotating lever 124 in FIG. 11 is constituted to rotate the rotating lever 124 itself in a perpendicularly right direction by being pressed by this screw feeding pressing rod 121 and using the shaft portion 125 as a pivot shaft when the screw feeding pressing rod 121 advances (lowering motion) interlocking with the tightening machine body 2 and also to function as a pressing receiving edge 124a for moving the feeding claw 126 in the arrow a direction, that is, to the feeding preparation position at the same time.

The engagement projecting piece 128a of the return lever 128 rotates in conjunction with the link lever 131 when the screw feeding pressing rod 121 advances (lowering motion) and rotates in a state in contact with the connecting ring 123 in the gap 122a on the upper side of the connecting ring 123.

On the other hand, when the screw feeding pressing rod 121 retreats (rising motion) to an initial position to the contrary of the advancing (lowering motion), the engagement projecting piece 128a is pushed upward by the connecting ring 123 and is rotated so as to return to the initial position with the rise of the screw feeding pressing rod 121 and as a result, functions so as to return the rotating lever 124 in conjunction with the link lever 131 to the initial position.

Subsequently, an operation of the continuous screw tightening machine 1 with washer stacking supply mechanism according to this embodiment will be described by referring to FIGS. 20 and 21 mainly on a tightening operation of the bit 3 and the washer W to the tightening target spot 100.

(Tightening Preparation State)

In the continuous screw tightening machine 1 with washer stacking supply mechanism according to this embodiment, the tightening machine body 2 is set to the standby position, the magazine body 104 is mounted on a rear part of the washer feeding unit 72 in this state and stacked on the washer feeding body 70 of the washer feeding unit 72, and the large number of washers W are stacked and arranged in the accommodating region 79.

Then, by manually operating the single operation lever 88, for example, the washer feeding body 70 is made to slide on the base plate 33 and the one washer W on a lowermost stage is fed into the washer temporary accommodating portion 32.

On the other hand, the screw rope 102 fed out of the magazine body 104 is passed between the front cover body 113 and the screw guide body 116 and the first screw S sandwiched between the feeding claw 126 and the screw pressing claw body 118, and this screw S is arranged in perpendicular arrangement between the bit 3 and the washer W and in concentric arrangement.

Moreover, the tip end of the band-shaped member 103 is inserted into the insertion hole 120 of the screw rope insertion body 119.

Moreover, a lower surface of the base plate 33 of the tip-end block 31 is set in arrangement in which the washer W is located immediately above the tightening target spot 100.

As described above, tightening preparation of the continuous screw tightening machine 1 with washer stacking supply mechanism is finished.

(Tightening Operation of Screw and Washer)

Subsequently, the trigger switch 6 is operated, and the tightening machine body 2 is guided by the tightening machine body guide mechanism 11 while the motor of the tightening machine body 2 is rotated and is lowered to the tightening possible position, and the bit 3 is engaged with a screw head of the screw S, the clutch is engaged, and the bit 3 is rotated/driven.

Moreover, the tightening machine body 2 is advanced (lowered), the screw S is penetrated in the hole Wa of the washer W, and moreover, the screw S is removed downward with the washer W from the washer temporary accommodating portion 32 and they are tightened and fixed to the tightening target spot 100, and then, the tightening operation is finished.

Figure 20:
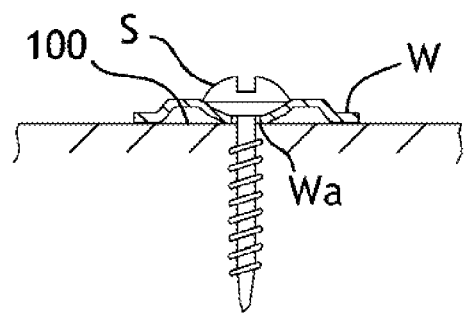
FIG. 20 is an outline sectional view illustrating state in which tightening of the screw and the washer to a tightening target spot is complete by the in the continuous screw tightening machine with washer stacking supply mechanism according to the embodiment.
Figure 21:
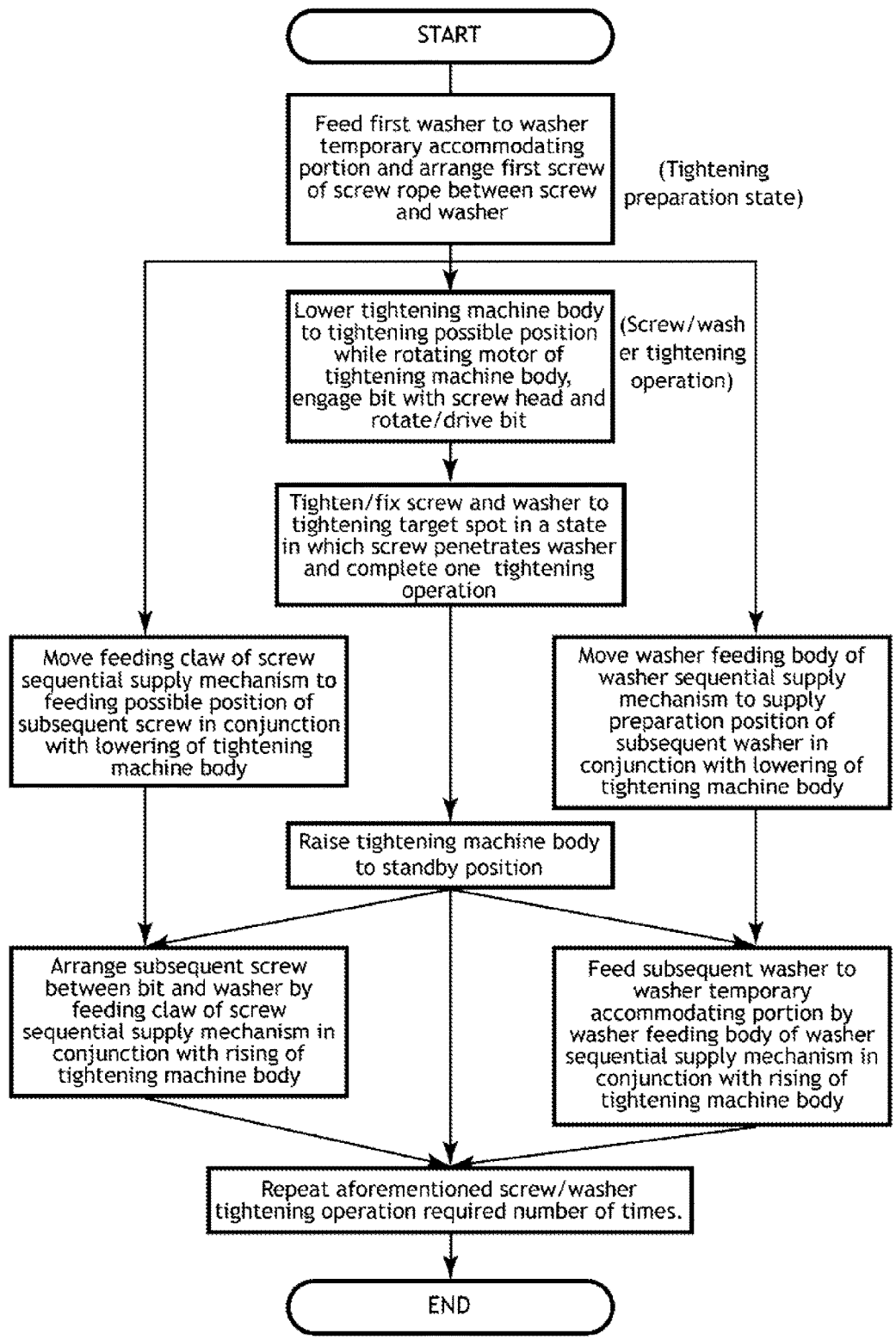
FIG. 21 is a flowchart illustrating a flow of a tightening operation of the screw and the washer in the continuous screw tightening machine with washer stacking supply mechanism according to the embodiment.
Figure 22:
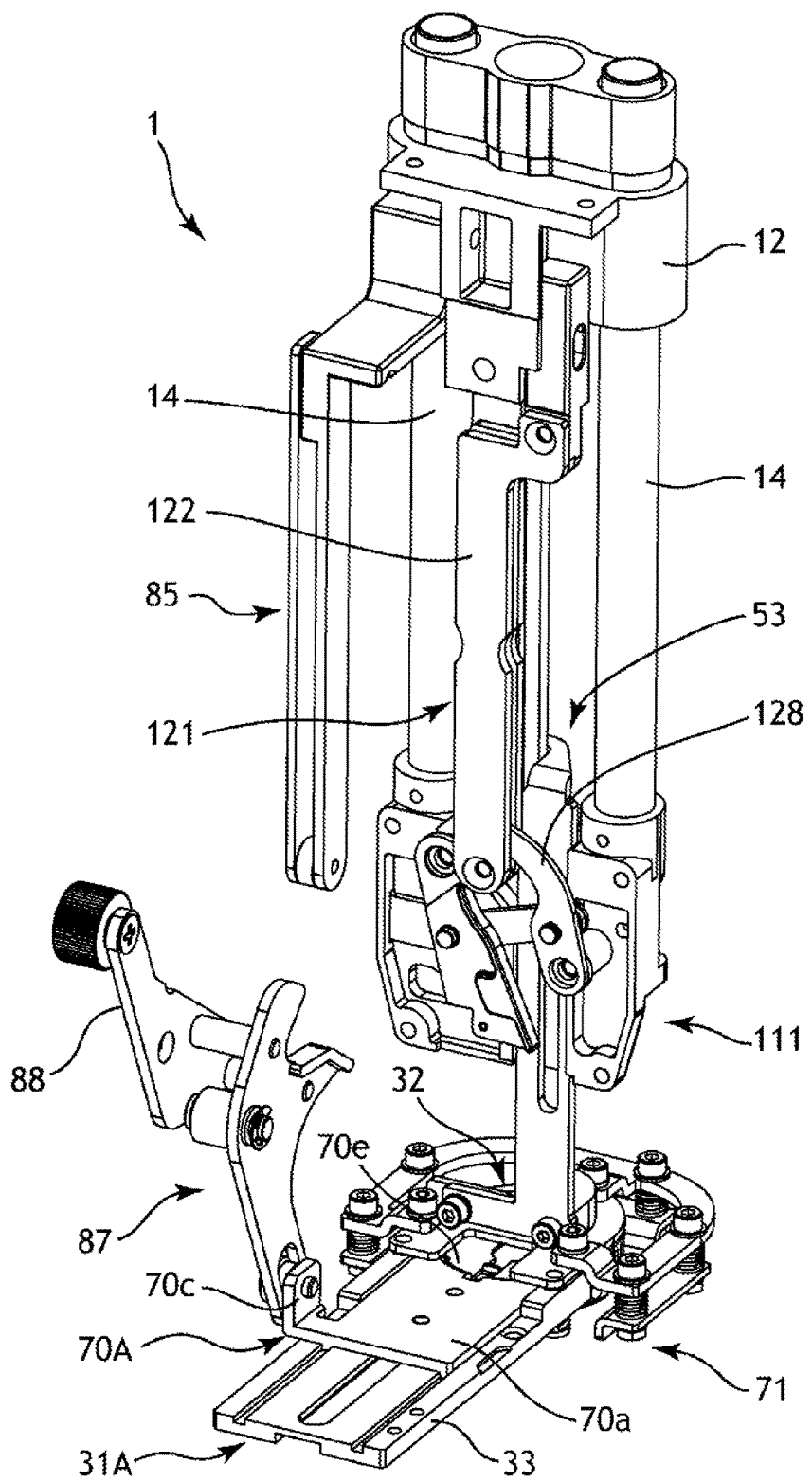
FIG. 22 is an outline perspective view illustrating an essential part of the screw sequential supply mechanism in the continuous screw tightening machine with washer stacking supply mechanism according to the embodiment and the washer sequential supply mechanism according to a variation in a state seen from diagonally rear.
Figure 23:
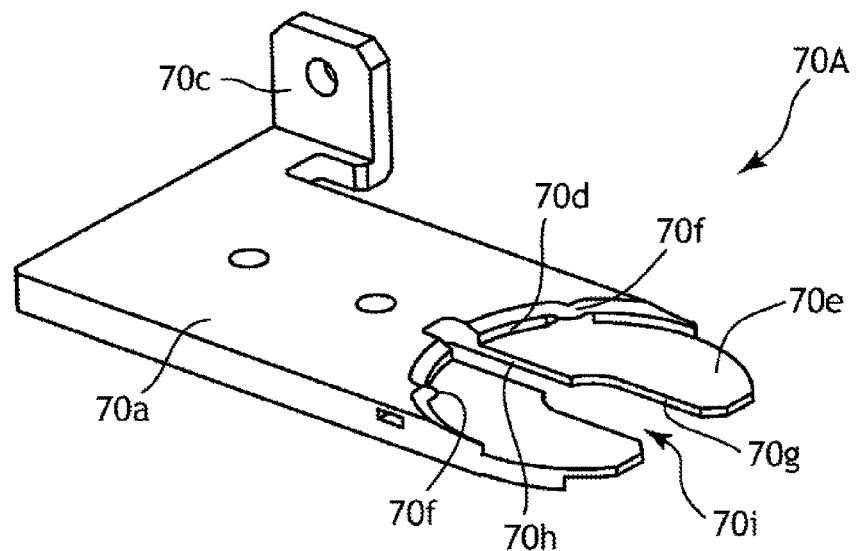
FIG. 23 is an outline perspective view of a washer feeding body in the washer sequential supply mechanism according to the variation.
Figure 24:
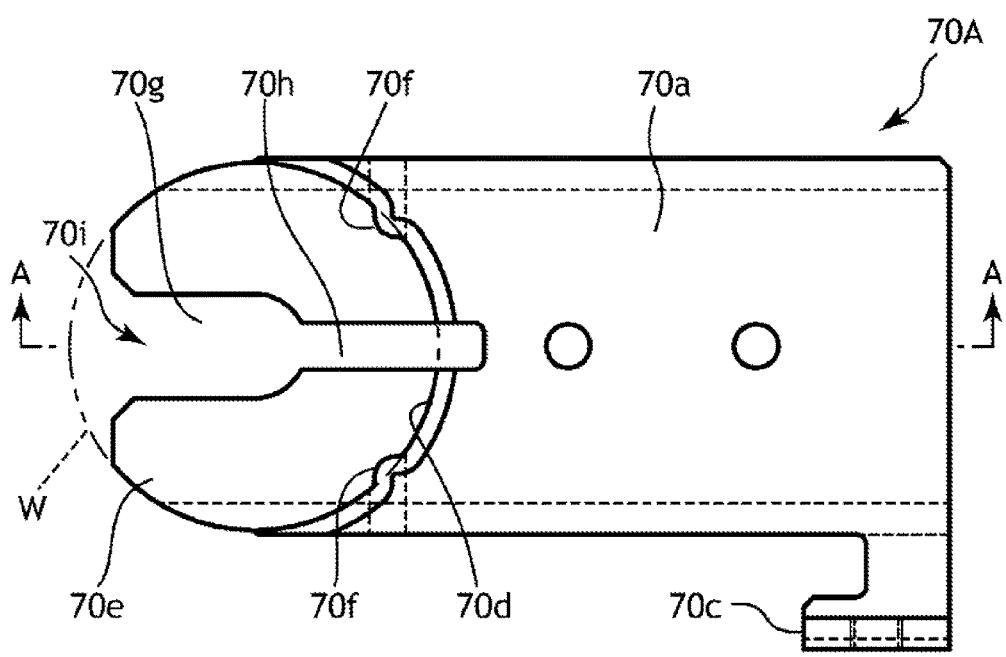
FIG. 24 is an outline plan view of the washer feeding body in the washer sequential supply mechanism according to the variation.
Figure 25:
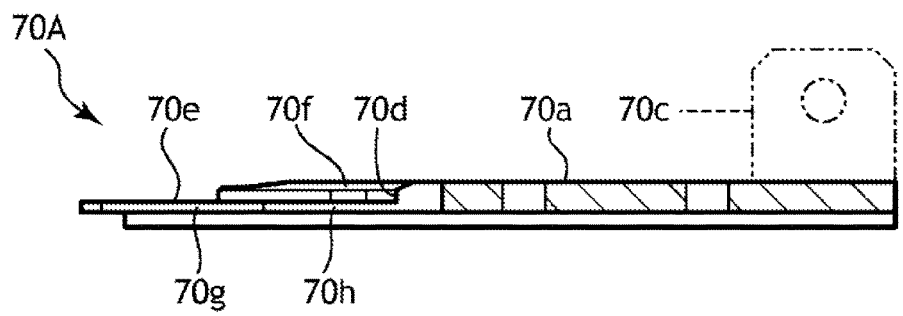
FIG. 25 is an A-A line sectional view of the washer feeding body illustrated in FIG. 24.

An example of the screw S and the washer W in the tightening finished state is illustrated in FIG. 20.

When the aforementioned engagement projection portion 3a of the bit 3 is set to the tightening possible position engaged with the screw head of the screw S and is further lowered, the rotating lever 124 is rotated by the screw feeding pressing rod 121 and with that, the feeding claw 126 is also moved in the arrow a direction and is positioned at the feeding preparation position of the subsequent screw S.

The feeding claw 126 is once brought into contact with the subsequent screw S when moving in the arrow a direction but is arranged at a position capable of riding over the subsequent screw S and feeding this screw S by rotation of the feeding claw 126 itself.

On the other hand, in the washer sequential supply mechanism 71, with lowering of the tightening machine body 2, the washer feeding pressing rod 85 also lowers and rotates the receiving piece portion 87a of the rotating lever 87.

With rotation of the receiving piece portion 87a, the slide operation piece portion 87b also rotates and causes the washer feeding body 70 to slide on the base plate 33 of the tip-end block 31 and returns it to the supply preparation position of the subsequent one washer W.

Figure 13:
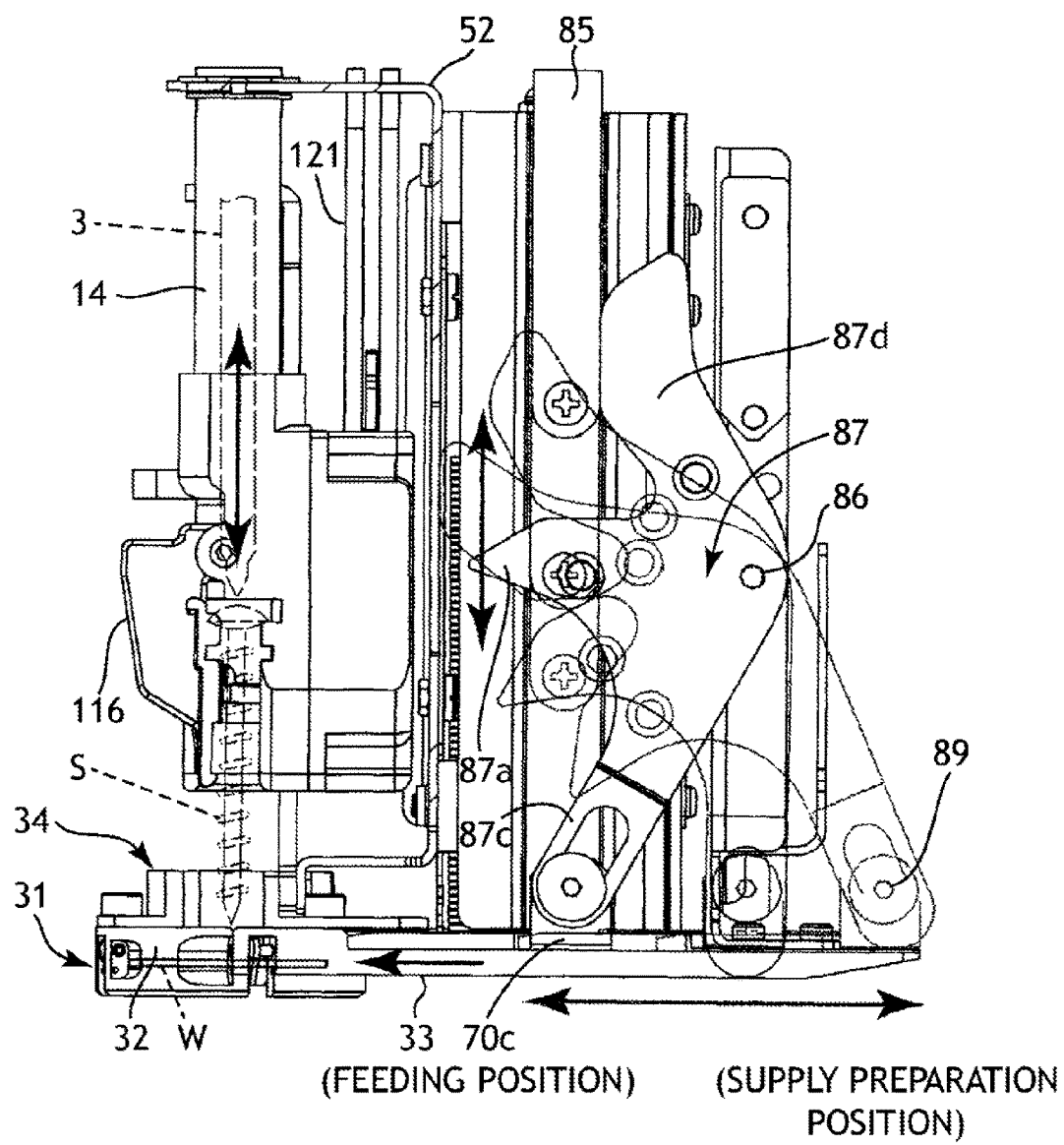
FIG. 13 is an explanatory diagram illustrating a rotating state of a rotating lever of the washer sequential supply mechanism and a feeding operation of the washer in the continuous screw tightening machine with washer stacking supply mechanism according to the embodiment.
Figure 14:
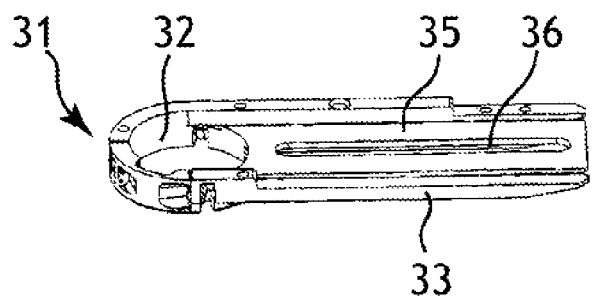
FIG. 14 is a perspective view of the washer sequential supply mechanism illustrating a base plate of a tip-end block in the continuous screw tightening machine with washer stacking supply mechanism according to the embodiment.
Figure 15:
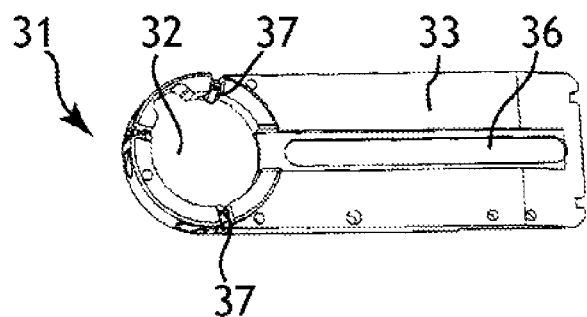
FIG. 15 is a bottom view illustrating the base plate of the tip-end block in the continuous screw tightening machine with washer stacking supply mechanism according to the embodiment.

The rotated state of the rotating lever 87 at this time is illustrated in FIG. 13.

When the bit S as described above is set to the tightening possible position and is further lowered, the screw feeding pressing rod 121 also lowers and has its lower end portion pass through the square hole 52f and faced with the upper surface of the base plate 33.

(Rising Operation of Tightening Machine Body 2 to Standby Position)

After the tightening operation of the one screw S and the washer W is finished as described above, the tightening machine body 2 is guided by the tightening machine body guide mechanism 11 and returned to the standby position and is moved to a tightening attitude of the subsequent screw S and the washer W.

When the tightening machine body 2 is retreated (rising motion) to be returned to the standby position, the washer feeding pressing rod 85 also rises and at this time, the returning piece portion 87d is brought into contact with the connecting ring 85b of the washer feeding pressing rod 85 and rotates the rotating lever 87 to return to the initial position by using the shaft portion 86 as a pivot shaft.

At this time, the slide operation piece portion 87b also rotates and causes the washer feeding body 70 to slide on the base plate 33 of the tip-end block 31 and feeds the second washer W into the washer temporary accommodating portion 32 of the tip-end block 31.

Moreover, when the tightening machine body 2 is retreated (rising motion) to be returned to the standby position, the screw feeding pressing rod 121 also rises and with that, the rotating lever 124 also rotates in a direction opposite to that in the aforementioned case, the feeding claw 126 moves in the arrow b direction and feeds the second screw S to the position capable of being tightened by the bit 3.

As a result, the continuous screw tightening machine 1 with washer stacking supply mechanism is brought into the state similar to the aforementioned tightening preparation state and takes an attitude capable of performing the second screw and washer tightening operation.

After that, the operation as described above is repeated, and the target number of the screws and washer tightening operation can be sequentially and continuously performed.

According to the continuous screw tightening machine 1 with washer stacking supply mechanism of this embodiment described above, characteristic effects as follows, are exerted.

In conjunction with a screw tightening stroke of the tightening machine body 2, screw feeding and washer supply are automatically performed. Therefore, a worker can tighten and fix the washer W and the screw S to the tightening target spot 100 at the same time only by advancing the tightening machine body 2 so as to perform the screw tightening operation, and by retreating the tightening machine body 2 to be returned to the standby position, the supply of the subsequent washer W to the washer temporary accommodating portion 32 and the supply of the subsequent screw S by the feeding claw 126 are preformed and as a result, the screw and washer tightening operation can be sequentially and continuously performed with efficiency.

Since the washers W are stacked and stored in the accommodating region 79 inside the screw-and-washer supply mechanism body 51 and the screw sequential supply mechanism 111 and the washer sequential supply mechanism 71 are also accommodated, there is substantially no member expanding outward obstructing the screw-and-washer supply mechanism body 51, the constitution is compact and light-weighted as a whole, which can greatly contribute to improvement of a working speed.

Moreover, since the screw S and the washer W to be tightened can be visually recognized from an outside, nonconformity such that only the screw S is tightened or only the washer W is fed out, for example, can be eliminated, and there is no worry of blank striking or double striking and working efficiency can be improved.

The washer W can be set in the accommodating region 79 only by lifting up the washer pressing piece 84 and by opening the lid body 78, and it is only necessary to load the washer W from the side and to close the lid body 78, which is simple and easy, and the washer W will no longer fall even if the screw-and-washer supply mechanism body 51 is tilted.

Only by operating the single operation lever 88, the washer single body can be supplied to the washer temporary accommodating portion 32 which is at the tightening preparation position and thus, it is extremely convenient when the washer single body is to be set after only the washer W is emptied.

Subsequently, a washer feeding body 70A according to a variation of the washer feeding body 70 and a tip-end block 31A according to a variation of the tip-end block 31 constituting the washer sequential supply mechanisms 71 will be described by referring to FIGS. 22 to 31.

In the washer feeding body 70A and the tip-end block 31A according to the variation, the same reference numerals are given to the same element as those in the case of the aforementioned washer feeding body 70 and the tip-end block 31, and detailed description will be omitted.

The washer feeding body 70A according to the variation of the washer feeding body 70 has, as illustrated in FIGS. 22 to 25, an arc-shaped contact portion 70d provided corresponding to a shape (substantial semicircular shape) of a part of an outer shape of the washer W brought into contact with the outer periphery of the washer W provided on a tip end side of the slide plate portion 70a, and has a seat surface portion 70e having a thickness smaller than the slide plate portion 70a and presenting a substantially semicircular shape supporting the lower surface of the washer W protruded closer to a tip end side from a lower part of the arc-shaped contact portion 70d in arrangement extending from the slide plate portion 70a.

That is, the arc-shaped contact portion 70d using a difference in plate thickness of the both is formed on a boundary portion between the slide plate portion 70a and the seat surface portion 70e.

Moreover, in an end surface of the arc-shaped contact portion 70d, a return claw 70f having a small thickness and a small width is projected in arrangement located on its upper end edge and in separate arrangement at two spots, for example, from the slide plate portion 70a side, and these return claws 70f are constituted so as to cover a part of the outer peripheral upper surface of the washer W in a non-restricted state in feeding of the washer W by the washer feeding body 70A.

Moreover, in the seat surface portion 70e, a seat surface concave portion 70i constituted by a recess portion 70g presenting a substantially U-shape formed in arrangement from its tip end side to a substantial center part and a notched recess portion 70h penetrating the arc-shaped contact portion 70d from a deepest part of this recess portion 70g and presenting a rectangular shape formed in arrangement biting into the slide plate portion 70a side is provided.

Subsequently, the tip-end block 31A according to the variation of the tip-end block 31 of the aforementioned embodiment will be described by referring to FIGS. 26 to 29.

The tip-end block 31A according to the variation has a basic constitution substantially similar to the tip-end block 31 but is characterized in that the latch portion 37 provided on the washer temporary accommodating portion 32 is abolished, and a movable latch portion 41 is provided in a part of the outer periphery of the washer temporary accommodating portion 32 of the tip-end block 31A and in an advancing/retreating region at the deepest part of the notched recess portion 70h of the seat surface portion 70e constituting the washer feeding body 70A at a position not in contact with the notched recess portion 70h when the washer W is loaded in the washer temporary accommodating portion 32 by the washer feeding body 70A.

Figure 27:
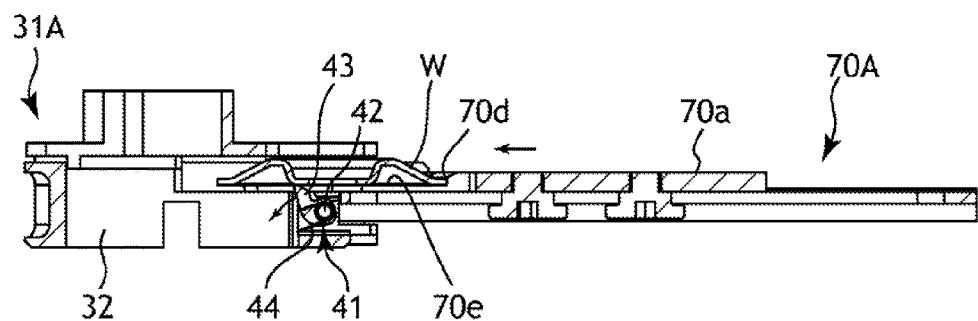
FIG. 27 is a B-B line sectional view of FIG. 26.
Figure 28:
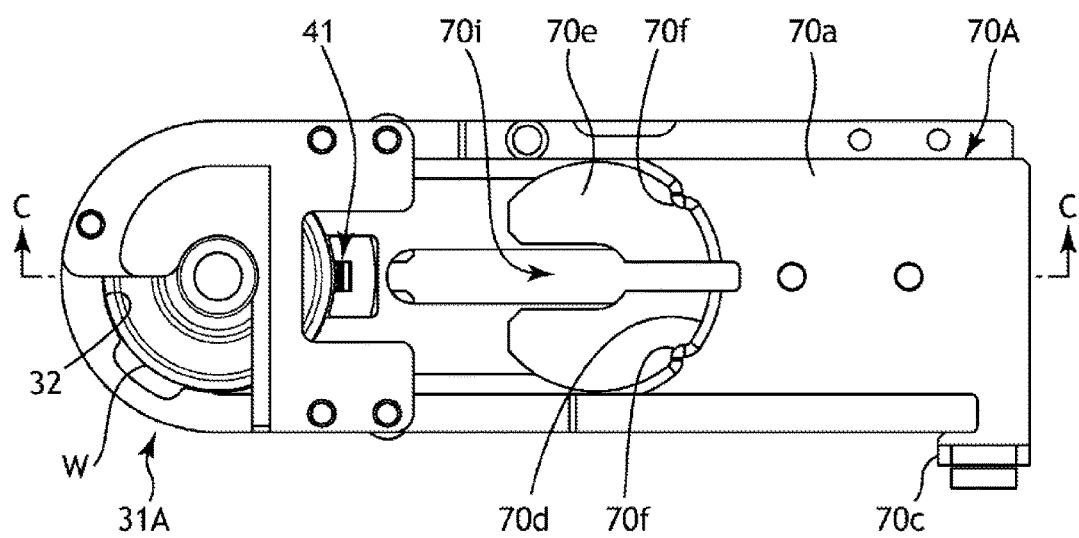
FIG. 28 is an outline plan view illustrating a state in retreating of the tip-end block in the washer sequential supply mechanism and the washer feeding body in the washer feeding body according to the variation.
Figure 29:
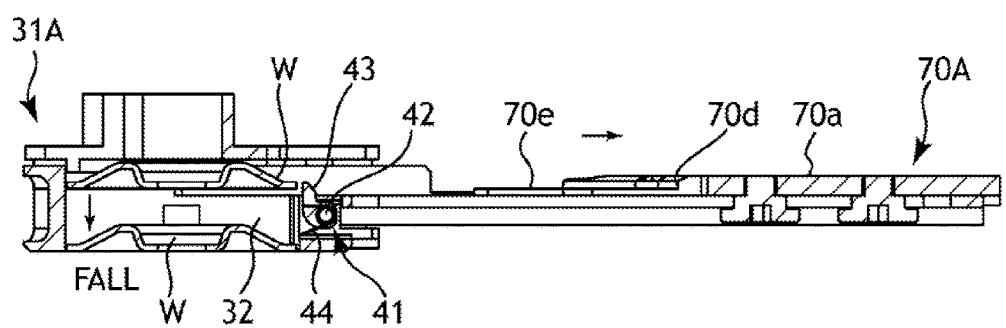
FIG. 29 is a C-C line sectional view of FIG. 28.

The movable latch portion 41 is constituted such that, as illustrated in FIGS. 27 to 29, a pivot pin 42 is arranged on an outer peripheral portion of the washer temporary accommodating portion 32 so that a latch piece 43 is supported rotatably in an advancing/retreating direction of the washer feeding body 70A and the latch piece 43 can be moved between a standing position illustrated in FIG. 29 and a position inclined to the washer temporary accommodating portion 32 side illustrated in FIG. 27 under an action of an urging force of a coil spring 44 wound around the pivot pin 42. Therefore, the movable latch portion 41 is constituted so as to be inclined only in the advancing direction of the washer feeding body 70A.

Figure 26:
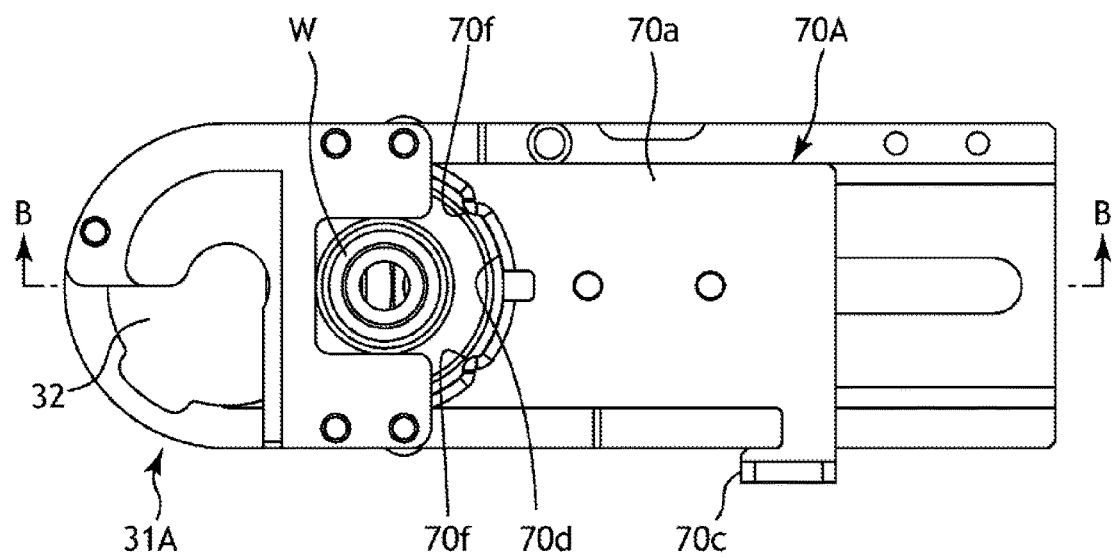
FIG. 26 is an outline plan view illustrating a state in the middle of washer feeding of the tip-end block and the washer feeding body in the washer sequential supply mechanism according to the variation.

That is, when the washer W is placed on the seat surface portion 70e of the washer feeding body 70A and fed into the washer temporary accommodating portion 32, the latch piece 43 of the movable latch portion 41 is pushed by the lower surface of the washer W exposed on the lower side from the recess portion 70g and inclined to the washer temporary accommodating portion 32 side against the urging force of the coil spring 44 as illustrated in FIGS. 26 and 27 and at the same time as the feeding into the washer temporary accommodating portion 32 is finished, as illustrated in FIGS. 28 and 29, the latch piece 43 of the movable latch portion 41 stands up by the urging force of the coil spring 44 and is brought into contact with the outer peripheral portion on the washer feeding body 70A side of the washer W which has been fed into the washer temporary accommodating portion 32 so as to regulate movement thereof, and when the washer feeding body 70A is retreated for feeding in the subsequent washer W, washer W is constituted not to retreat with the washer feeding body 70A.

Subsequently, various actions and effects with a supply operation of the washer W to the washer temporary accommodating portion 32 by the washer feeding body 70A and the tip-end block 31A according to the aforementioned variation will be described by referring also to FIGS. 30 and 31.

Figure 30:
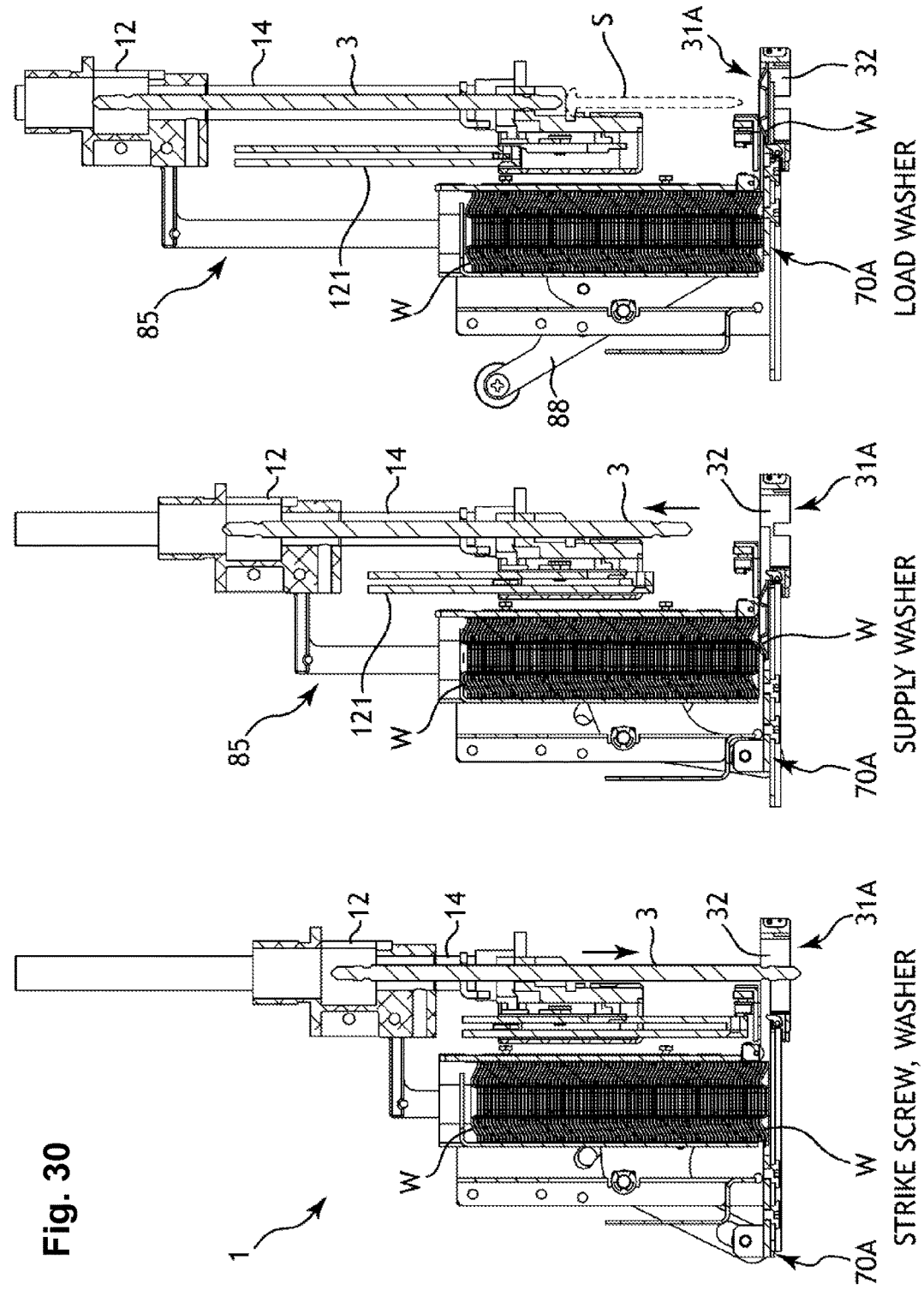
FIG. 30 is an operational explanatory view illustrating a state in striking of the screw and the washer, in feeding of the washer, and in loading of the washer to the tip-end block in the continuous screw tightening machine with washer stacking supply mechanism including the washer sequential supply mechanism according to the variation.

FIG. 30 illustrates states of striking of the screw S and the washer W (in tightening operation) by the tightening machine body 2 in the continuous screw tightening machine 1 with washer stacking supply mechanism including the washer sequential supply mechanism 71, washer feeding by the washer feeding body 70A, and washer loading onto the temporary accommodating portion 32 of the tip-end block 31A according to the variation.

Figure 31:
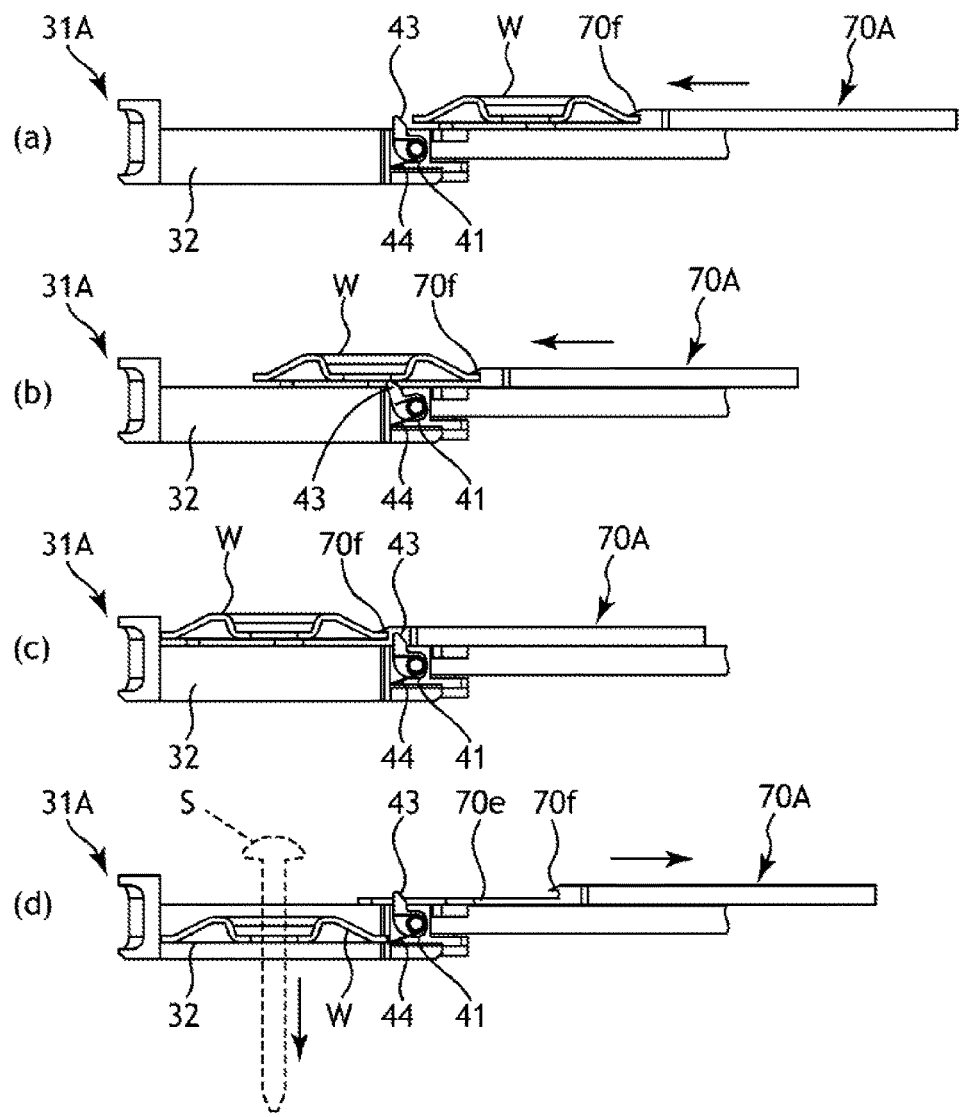
FIG. 31 is an operational explanatory view of an operation from the washer feeding to the tip-end block by the washer feeding body in the washer sequential supply mechanism to retreating according to the variation and an operation of a movable latch portion.

Moreover, FIG. 31 schematically illustrates states of (a) in the middle of washer feeding into the tip-end block 31A by the washer feeding body 70A in the washer sequential supply mechanism 71 according to the variation, (b) start of advancing of the washer W to the washer temporary accommodating portion 32 by the washer feeding body 70A, (c) loading of the washer W onto the washer temporary accommodating portion 32, and (d) retreating of the washer feeding body 70A and a state of the movable latch portion 41.

If the arc-shaped concave portion 70b in the washer feeding body 70 of the aforementioned embodiment is worn, a situation that, when the washer W is to be fed, the washer W is removed from the arc-shaped concave portion 70b and struck blankly occurs, and it is likely that tightening only of the screw S in a state without the washer W due to blank feeding and that double-feeding state of the washer W is caused by re-sending after blank feeding in the middle of the feeding of the washer W and the washer W is clogged.

On the other hand, by employing the washer feeding body 70A and the tip-end block 31A according to the variation, the washer W is reliably supported by the seat surface portion 70e provided with the arc-shaped contact portion 70d of the washer feeding body 70A, and the washer W can be reliably loaded onto the washer temporary accommodating portion 32 of the tip-end block 31A one by one so as to cover a part of the outer peripheral upper surface of the washer W by the return claw 70f in a non-restricted state.

As a result, occurrence of a state of nonconformity such that tightening only of the screw S due to blank feeding of the washer W or clogged state of the washer W caused by double feeding of the washer W or the like can be eliminated.

Subsequently, in the aforementioned embodiment, it is so constituted that the latch portion 37 is provided on the washer temporary accommodating portion 32 in the tip-end block 31, but in this case, since the washer W is fed to the washer temporary accommodating portion 32 and the washer W is loaded on the upper part of the latch portion 37, if the washer W is removed from the latch portion 37 due to vibration of the tightening machine body 2 or an impact, it is likely that the washer blank striking state in which only the screw S is fastened without the washer W occurs.

On the other hand, in the tip-end block 31A according to the variation, it is constituted such that the latch portion 37 is abolished, and the washer W is not removed by the vibration of the tightening machine body 2 or the impact by supporting the lower surface of the washer W by the seat surface portion 70e of the washer feeding body 70A, and thus, occurrence of nonconformity that the washer is removed and only the screw S is fastened in the blank state can be eliminated.

Subsequently, in the aforementioned embodiment, the washer W is fed to the washer temporary accommodating portion 32 by the washer feeding body 70, the washer W is loaded on the upper part of the latch portion 37, and if the washer W is fed again in that state, due to a clearance into which only one washer W can enter, the excess one washer W is removed from the latch portion 37 so as to prevent double striking of the washer W, but if the latch portion 37 is worn, two pieces of the washers W are loaded on the washer temporary accommodating portion 32, and it is likely that a state of nonconformity like double striking of the washer W occurs.

On the other hand, in the tip-end block 31A according to the variation, the movable latch portion 41 as described above is provided on the washer temporary accommodating portion 32, and it is constituted such that movement of the washer W which has been already fed by the latch piece 43 to the washer feeding body 70A side is regulated, and thus, only one washer W is loaded on the washer temporary accommodating portion 32 reliably, and double striking of the washer W can be eliminated.

Moreover, even if such a situation that blank striking of the screw S by the tightening machine body 2 is caused by some factor such as end of supply of the screw S or the like in the washer temporary accommodating portion 32 and only one washer W remains occurs, since the movement of the washer W to the washer feeding body 70A side is regulated by the latch piece 43 of the movable latch portion 41, the remaining washer W can be made to fall downward.

INDUSTRIAL APPLICABILITY

The continuous screw tightening machine with washer stacking supply mechanism according to the present invention can be widely applied to interior works of a wall surface, a floor surface and the like inside a building, exterior works of an outer wall of the building and the like in addition to the roofing works.

REFERENCE SIGNS LIST 1 continuous screw tightening machine with washer stacking supply mechanism
2 tightening machine body
3 bit for screw tightening
3a engagement projection portion
3b groove
4 power cable
5 plug
6 trigger switch
7 grip handle
11 tightening machine body guide mechanism
12 upper slide mounting portion
13 lower mounting portion
14 guide pole
31 tip-end block
31A tip-end block
32 washer temporary accommodating portion
33 base plate
34 bit guide body
35 slide recess portion
36 long hole
37 latch portion
38a concave portion
38b perpendicular standing portion
41 movable latch portion
42 pivot pin
43 latch piece
44 coil spring
51 screw-and-washer supply mechanism body
52 pole support body
52a perpendicular piece
52b horizontal piece
52c wall-surface forming plate portion
52d guide pole support piece
52e right-side bent piece
52f square hole
53 bit guide rod
53a lower end portion
53b perpendicular portion
53c bit loose-fit piece
53d through hole
70 washer feeding body
70A washer feeding body
70a slide plate portion
70b arc-shaped concave portion
70c feeding receiving piece
70d arc-shaped contact portion
70e seat surface portion
70f return claw
70g recess portion
70h notched recess portion
70i seat surface concave portion
71 washer sequential supply mechanism
72 washer feeding unit
73 front wall surface plate
74 right-side side surface plate
74a arc-shaped long hole
75 rear-side wall surface plate
76 attachment receiving piece
77 partition plate
77a front-side mounting plate portion
77b right-side partition plate portion
77c rear-side partition plate portion
78 lid body
79 accommodating region
80 hinge
81 guide rod
82 moving box body
83 knob
84 washer pressing piece
85 washer feeding pressing rod
85a suspended plate
85b connecting ring
85c gap
86 shaft portion
87 rotating lever
87a receiving piece portion
87b slide operation piece portion
87c engagement long hole
87d returning piece portion
88 single operation lever
89 engagement pin
90 connecting rod
91 connecting rod
100 tightening target spot
101 screw rope magazine
102 screw rope
103 band-shaped member
104 magazine body
105a hinge
105n bracket
106 outer lid
107 taking-out port
108 inner lid
109 boss
111 screw sequential supply mechanism
112 screw feeding unit
113 front cover body
113a screw head passing groove
114 rear cover body
115 shaft portion
116 screw guide body
116a screw head passing groove
117 shaft portion
118 screw pressing claw body
119 screw rope insertion body
120 insertion hole
121 screw feeding pressing rod
122 suspended plate
122a gap
123 connecting ring
124 rotating lever
124a pressing receiving edge
125a shaft portion
125b shaft portion
126 feeding claw
127 shaft portion
128 returning lever
128a engagement projecting piece
129 shaft portion
130 shaft portion
131 link lever
S screw
W washer
Wa hole

What is claimed is:

1. A continuous screw tightening machine with washer stacking supply mechanism comprising:
a tightening machine body on which a driving machine is mounted and connecting a bit for screw tightening rotated/driven by the driving machine detachably and rotatably,
a tightening machine body guide mechanism advancing/retreating the tightening machine body between a standby position and an advanced position where the bit is advanced so as to be arranged at a position capable of tightening a screw, a tip-end block provided below the tightening machine body guide mechanism and provided with a washer temporary accommodating portion for accommodating one washer having a hole through which the screw is inserted, capable of being withdrawn downward and a base plate capable of placing a large number of the washers in stacked arrangement, and arranged on a tightening target spot, a screw-and-washer supply mechanism body arranged between the tightening machine body guide mechanism and the tip-end block and having an accommodating region for a large number of the washers in stacked arrangement on a rear side, a washer sequential supply mechanism interlocked with the tightening machine body and incorporated in the accommodating region of the screw-and-washer supply mechanism body from a side portion to a lower part and for automatically supplying the washer on a lowermost stage in a large number of the washers stacked on the base plate and accommodated in the screw-and-washer supply mechanism body to the washer temporary accommodating portion in conjunction with retreating of the tightening machine body to the standby position by sliding it on the base plate of the tip-end block by a washer feeding body provided with a concave portion corresponding to an outer shape of the washer and automatically returning the washer feeding body in conjunction with advancing of the tightening machine body to an advanced position to a supply preparation position of the subsequent one washer, a screw rope magazine accommodating a screw rope to which a large number of the screws are connected at a constant interval by a band-shaped member, capable of being fed out and detachably arranged on a rear part side of the screw-and-washer supply mechanism body, and a screw sequential supply mechanism interlocked with the tightening machine body and incorporated in the screw-and-washer supply mechanism body and in conjunction with advancing of the tightening machine body to a position capable of tightening the bit, automatically moving a feeding claw for feeding each screw of the screw rope supplied from the screw rope magazine to a supply preparation position of the one screw connected to the screw rope and in conjunction with retreating of the tightening machine body to the standby position, automatically supplying the screw in order by the feeding claw so as to be in concentric arrangement between a tip end of the bit and a hole of the washer, wherein rotation/driving of the bit advanced to the tightening possible position by the driving machine, removes the screw downward from the washer temporary accommodating portion such that the screw together with the washer is tightened and fixed teat the tightening target spot.

2. The continuous screw tightening machine with washer stacking supply mechanism according to claim 1, wherein the screw-and-washer supply mechanism body includes a lid body opening/closing a side surface of the accommodating region of a large number of the washers in the stacked arrangement, a pair of guide rods mounted in fixed arrangement to perpendicular arrangement on an outer side of the lid body, a moving box body provided with a knob supported by the pair of guide rods, capable of vertical movement, and a washer pressing piece mounted on the moving box body for pressing an uppermost part of a large number of the washers in stacked arrangement.

3. A continuous screw tightening machine with washer stacking supply mechanism comprising: a tightening machine body on which a driving machine is mounted, connecting a bit for screw tightening rotated/driven by the driving machine detachably and rotatably and arranged capable of advancing/retreating between a standby position and a tightening possible position by the bit, a tip-end block provided below the tightening machine body, provided with a washer temporary accommodating portion for accommodating one washer capable of being withdrawn downward, and arranged on a tightening target spot, a screw-and-washer supply mechanism body arranged between the tightening machine body and the tip-end block, having an accommodating region for stacking a large number of the washers in stacked arrangement on a rear side and capable of concentric arrangement of screws between the bit and the washer, a washer sequential supply mechanism incorporated in the accommodating region of the screw-and-washer supply mechanism body from a side portion to a lower part and provided with a washer feeding body for engaging a concave portion corresponding to an outer shape of the washer with an outer periphery of the washer and feeding it to the washer temporary accommodating portion, a screw rope magazine accommodating a screw rope to which a large number of the screws are connected at a constant interval by a band-shaped member, capable of being fed out and detachably arranged on a rear part side of the screw-and-washer supply mechanism body, and a screw sequential supply mechanism incorporated in the screw-and-washer supply mechanism body, wherein in conjunction with retreating of the tightening machine body, the washer is automatically supplied to the washer temporary accommodating portion by the washer sequential supply mechanism, one of the screws connected to the screw rope from the screw rope magazine is automatically supplied by the screw sequential supply mechanism so as to be concentrically arranged between the washer and the bit, in conjunction with advancing of the tightening machine body, the washer sequential supply mechanism is automatically set to a feeding preparation attitude for the subsequent washer, and the screw sequential supply mechanism is automatically set to a feeding preparation attitude for the subsequent screws wherein the screw-and-washer supply mechanism body includes a lid body opening/closing a side surface of the accommodating region of a large number of the washers in the stacked arrangement, a pair of guide rods mounted in fixed arrangement to perpendicular arrangement on an outer side of the lid body, a moving box body provided with a knob supported by the pair of guide rods, capable of vertical movement, and a washer pressing piece mounted on the moving box body for pressing an uppermost part of a large number of the washers in stacked arrangement.

* * * * *